US011140170B2

(12) United States Patent
Barouch et al.

(10) Patent No.: US 11,140,170 B2
(45) Date of Patent: Oct. 5, 2021

(54) NETWORK-BASED PARTIAL AND FULL USER IDENTIFICATION TECHNIQUES

(71) Applicant: Online Media Holdings Ltd, Surry Hills (AU)

(72) Inventors: Jonathan Barouch, Surry Hills (AU); Peter Williams, Belmont, CA (US)

(73) Assignee: ONLINE MEDIA HOLDINGS LTD, Surry Hills (AU)

( * ) Notice: Subject to any disclaimer, the term of this patent is extended or adjusted under 35 U.S.C. 154(b) by 49 days.

(21) Appl. No.: 16/376,313

(22) Filed: Apr. 5, 2019

(65) Prior Publication Data

US 2020/0322341 A1  Oct. 8, 2020

(51) Int. Cl.
*H04L 29/06* (2006.01)
*H04L 29/08* (2006.01)
*H04L 12/26* (2006.01)

(52) U.S. Cl.
CPC ........ *H04L 63/102* (2013.01); *H04L 43/0876* (2013.01); *H04L 63/08* (2013.01); *H04L 67/16* (2013.01); *H04L 67/18* (2013.01); *H04L 67/22* (2013.01); *H04L 67/306* (2013.01); *H04L 67/32* (2013.01)

(58) Field of Classification Search
None
See application file for complete search history.

(56) References Cited

U.S. PATENT DOCUMENTS

| 8,131,745 | B1* | 3/2012 | Hoffman ............. G06Q 10/107 707/766 |
|---|---|---|---|
| 8,561,127 | B1 | 10/2013 | Agrawal et al. |
| 8,572,697 | B2 | 10/2013 | Hayes et al. |
| 9,590,950 | B2 | 3/2017 | Hallett et al. |
| 9,665,638 | B2 | 5/2017 | Eigner et al. |
| 10,231,100 | B2 | 3/2019 | Ross et al. |
| 10,237,256 | B1 | 3/2019 | Pena et al. |
| 10,282,753 | B2 | 5/2019 | Cheung |
| 10,311,250 | B2 | 6/2019 | Khi et al. |

(Continued)

FOREIGN PATENT DOCUMENTS

| KR | 10-1040519 | 6/2011 |
|---|---|---|
| KR | 10-2017-0091951 | 8/2017 |

OTHER PUBLICATIONS

International Search Report and Written Opinion dated Jul. 21, 2020 issued for International PCT Application No. PCT/IB2020/053179.

(Continued)

*Primary Examiner* — Andrew J Steinle
(74) *Attorney, Agent, or Firm* — K&L Gates LLP

(57) ABSTRACT

Methods and systems for network-based user authentication are provided. In one embodiment, a method is provided that include receiving a request to connect to a local network. The request may be received from a user device and may include a user device identifier. The method may then include allowing the user device to connect to the local network and create a partial identity of a user of the user device. The partial identity may include a plurality of identification factors associated with the user. The method may then include monitoring network activities of the user device and updating the partial identity based on the monitored network activities.

20 Claims, 11 Drawing Sheets

(56) References Cited

U.S. PATENT DOCUMENTS

| | | | |
|---|---|---|---|
| 2007/0256122 A1* | 11/2007 | Foo | H04L 63/1433 726/5 |
| 2009/0182873 A1 | 7/2009 | Spalink et al. | |
| 2010/0262703 A1 | 10/2010 | Faynberg et al. | |
| 2011/0004588 A1* | 1/2011 | Leitersdorf | G06F 16/951 707/711 |
| 2011/0276689 A1* | 11/2011 | Rosen | G06Q 30/0267 709/224 |
| 2013/0144721 A1 | 6/2013 | Noh et al. | |
| 2013/0231999 A1* | 9/2013 | Emrich | G06Q 30/0271 705/14.43 |
| 2013/0346357 A1 | 12/2013 | Motahari et al. | |
| 2014/0025786 A1 | 1/2014 | Gage | |
| 2015/0032821 A1 | 1/2015 | Chen et al. | |
| 2015/0066669 A1 | 3/2015 | Francis et al. | |
| 2015/0113126 A1 | 4/2015 | Fluehr et al. | |
| 2017/0223015 A1 | 8/2017 | Lee et al. | |
| 2018/0025140 A1 | 1/2018 | Edelman et al. | |
| 2018/0249330 A1 | 8/2018 | Zhang et al. | |
| 2018/0331836 A1 | 11/2018 | Burbank et al. | |

OTHER PUBLICATIONS

International Search Report and Written Opinion dated Jul. 20, 2020 issued for International PCT Application No. PCT/IB2020/053334.

* cited by examiner

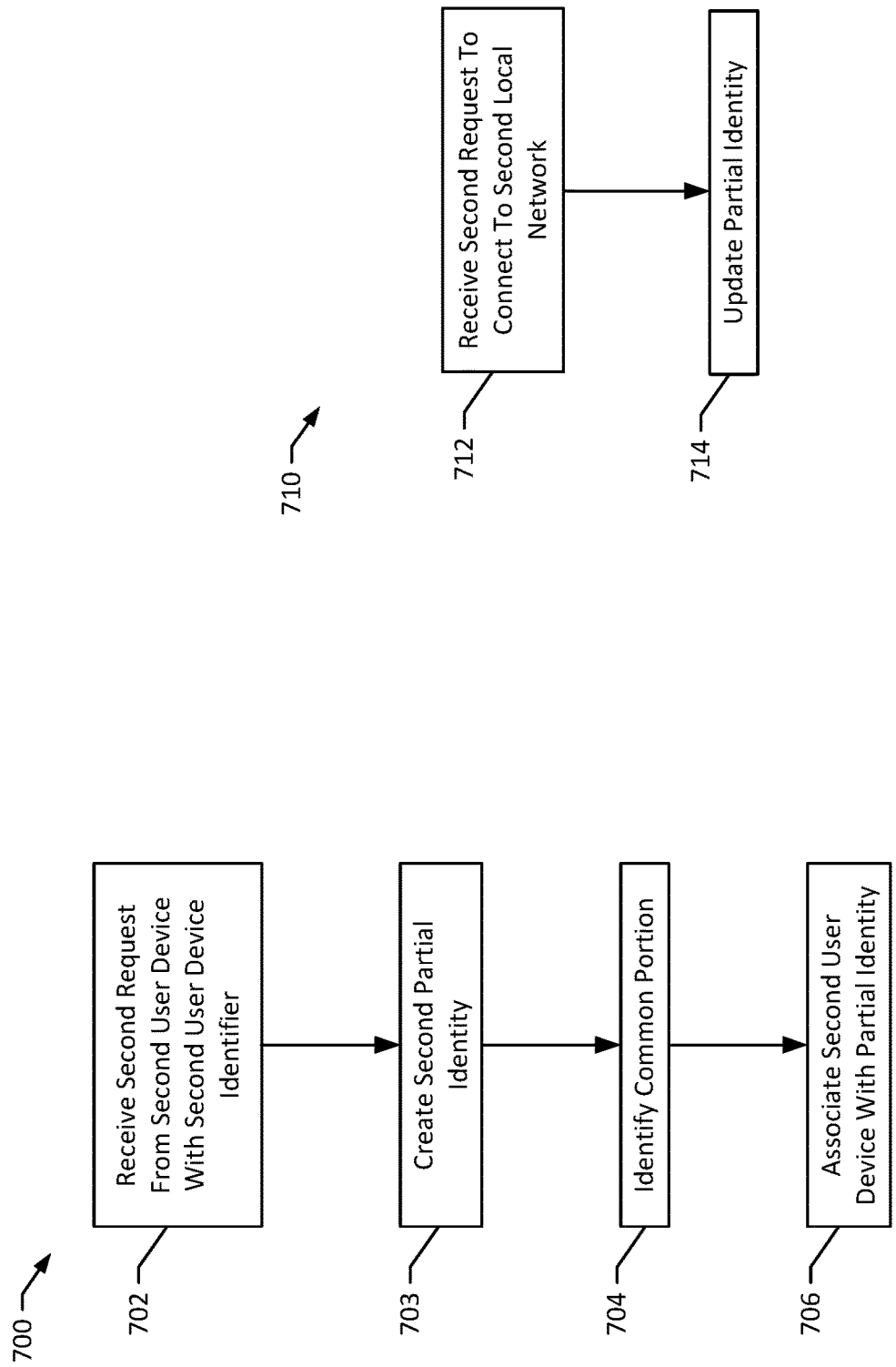

NETWORK-BASED PARTIAL AND FULL USER IDENTIFICATION TECHNIQUES

BACKGROUND

It is important for most companies, especially companies in the service industry, to have accurate data on their customers and their customers' experiences with the company. Accurate data on customers can help a company better target marketing and sales efforts. Similarly, data describing customers' experiences and sentiments can help companies recognize both what customers like and dislike about the company's products and/or service offerings and to tailor customer experience to those preferences.

SUMMARY

The present disclosure presents new and innovative systems and methods for network-based user identification. In a first aspect, a method is provided comprising receiving a request from a user device to connect to a local network, wherein the request includes a user device identifier, allowing the user device to connect to the local network, and responsive to allowing the user device to connect, creating a partial identity of a user of the user device, wherein the partial identity is a collection of identification factors associated with the user. The method may further comprise monitoring one or more network activities of the user device on the local network and updating the partial identity of the user based on the one or more monitored network activities.

In a second aspect according to the first aspect, the method may further comprise presenting a user feedback request to the user device without determining a full identity of the user, receiving a response to the user feedback request, and storing the response associated with the partial identity.

In a third aspect according to the second aspect, the user feedback request is presented responsive to one or more of (i) allowing the user device to connect to the local network and after creating the partial identity and (ii) a location of the user device indicating that the user device has entered a service area of the local network.

In a fourth aspect according to the second and/or the third aspect, the full identity includes a full name of the user and preferably includes at least one of a name of the user, a preference of the user, an email address of the user, and a phone number of the user.

In a fifth aspect according to any of the second through fifth aspects, the method further comprises obtaining the full identity of the user in response to the user feedback request.

In a sixth aspect according to the fifth aspect, the user provides at least a portion of the full identity while responding to the user feedback request. In such aspects, the user-provided information may be combined with the partial identity to obtain the full identity. In such aspects, the user-provided information may also be combined with additional information derived from one or both of the user-provided information and the partial identity to obtain the full identity.

In a seventh aspect according to any of the previous aspects, the method may further comprise generating a personalized service offering for the user based on the partial identity.

In an eighth aspect according to the seventh aspect, the personalized service offering is generated without determining a full identity of the user.

In a ninth aspect according to the seventh and/or the eighth aspects, the method may further comprise updating the partial identity responsive to the user accepting or rejecting the personalized service offering by identifying a service-based preference associated with the personalized service offering, responsive to the user accepting the personalized service offering, adding a positive indication of the service-based preference to the partial identity, and responsive to the user rejecting the personalized service offering, adding a negative indication of the service-based preference to the partial identity.

In a tenth aspect according to the ninth aspect, the method may further comprise obtaining the full identity of the user based on the user accepting or rejecting the personalized service offering.

In an eleventh aspect according to the tenth aspect, the user provides the full identity while accepting the personalized service offering.

In a twelfth aspect according to any of the previous aspects, the method may further comprise monitoring locations of the user device within a network service area of the local network over time, wherein the locations are determined based at least in part on a signal strength between the user device and a wireless network device implementing the local network, and wherein the partial identity is also updated based on the monitored locations.

In a thirteenth aspect according to the twelfth aspect, updating the partial identity based on the monitored locations further comprises identifying a location-based service associated with a physical location of the user device within the network service area indicated by the signal strength between the user device and a network device implementing the local network, identifying a location-based preference associated with the location-based service, and adding an indication of the location-based preference to the partial identity.

In a fourteenth aspect according to the twelfth and/or the thirteenth aspects, the location activities include a location derived from a geofence defined by proximity to the network device.

In a fifteenth aspect according to any of the previous aspects, the network activities include one or more activities selected from the group consisted of: the user device accessing one or more network services, network usage patterns of the user device, and web browsing activities of the user device.

In a sixteenth aspect according to any of the previous aspects, allowing the user device to connect to the local network includes receiving user credentials associated with a user of the user device, and wherein creating the partial identity further includes deriving a user identifier from the user credentials.

In a seventeenth aspect according to any of the previous aspects, the method further comprises continuing to monitor one or more additional network activities of the user device on the local network and obtaining a full identity of the user based on the one or more additional network activities.

In an eighteenth aspect according to the seventeenth aspect, the additional network activities include one or more activities selected from the group consisting of: the user device logging into to an internet service, the user device accessing an internet service which was logged into previously, and usage patterns associated with a previously-identified full identity.

In a nineteenth aspect according to the seventeenth and/or eighteenth aspects, obtaining the full identity of the user includes linking the partial identity to a previously-identified full identity.

In a twentieth aspect according to any of the previous aspects, the method further comprises receiving a second request from a second user device to connect to the local network, wherein the request includes a second user device identifier, identifying a common portion of the partial identity and the second user device identifier, and associating the second user device with the partial identity.

In a twenty-first aspect according to any of the previous aspects, the method further comprises receiving a second request from the user device to connect to a second local network, wherein the request includes the user device identifier and updating the partial identity to include the second local network.

In a twenty-second aspect according to any of the previous aspects, the request from the user device to connect to the local network is received and processed by an access point of the local network.

In a twenty-third aspect according to any of the previous aspects, the request from the user device to connect to the local network is received at an access point of the local network and processed at an identification server of the network.

In a twenty-fourth aspect according to any of the previous aspects, the network activities are monitored using a single access point of the local network.

In a twenty-fifth aspect according to any of the previous aspects, the network activities are monitored across a plurality of access points of the local network.

In a twenty-sixth aspect according to any of the previous aspects, the partial identity of the user is updated without the user disconnecting from the local network.

In a twenty-seventh aspect according to any of the previous aspects, the partial identity of the user is updated after the user has disconnected from the local network and reconnected to the local network.

In a twenty-eighth aspect according to any of the previous aspects, the local network is a W-Fi network.

In a twenty-ninth aspect according to any of the previous aspects, creating the partial identity includes adding the user device identifier to the partial identity.

In a thirtieth aspect, a server is provided configured to receive a plurality of user device identifiers from a plurality of local networks, create a plurality of partial identities that each correspond to at least one of the plurality of user device identifiers, and monitor network activities associated with at least a subset of the plurality of user device identifiers. The network activities may be monitored by the server, or may be monitored by the local networks and transmitted to the server by the local networks. The method may further include updating, based on the network activities associated with subset of the user device identifiers, the partial identities that correspond to the subset of the user device identifiers.

In a thirty-first aspect, a system is provided comprising a plurality of network devices implementing at least one local network and a server. The server may be configured to receive a user device identifier from a first network device at a first time, create a partial identity for a user associated with the user device identifier, associate the partial identity with a first physical location associated with the first network device at the first time. The server may be further configured to receive the user device identifier from a second network device at a second time after the first time, associate the partial identity with a second physical location associated with the second network device at the second time, determine at least one location-based service offered at one or both of the first and second physical locations, and updating the partial identity based on the at least one location-based service.

In a thirty-second aspect, a method is provided comprising receiving a request from a user device to connect to a local network, wherein the request includes a user device identifier, allowing the user device to connect to the local network, responsive to allowing the user device to connect, creating a partial identity of a user of the user device that includes the user device identifier, wherein the partial identity is a collection of identifiers associated with the user, monitoring one or more network activities of the user device on the local network, and determining a full identity of the user based on the one or more network activities and the partial identity.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIGS. 7A and 7B illustrate methods according to exemplary embodiments of the present disclosure.

DETAILED DESCRIPTION OF EXAMPLE EMBODIMENTS

Figure 1:
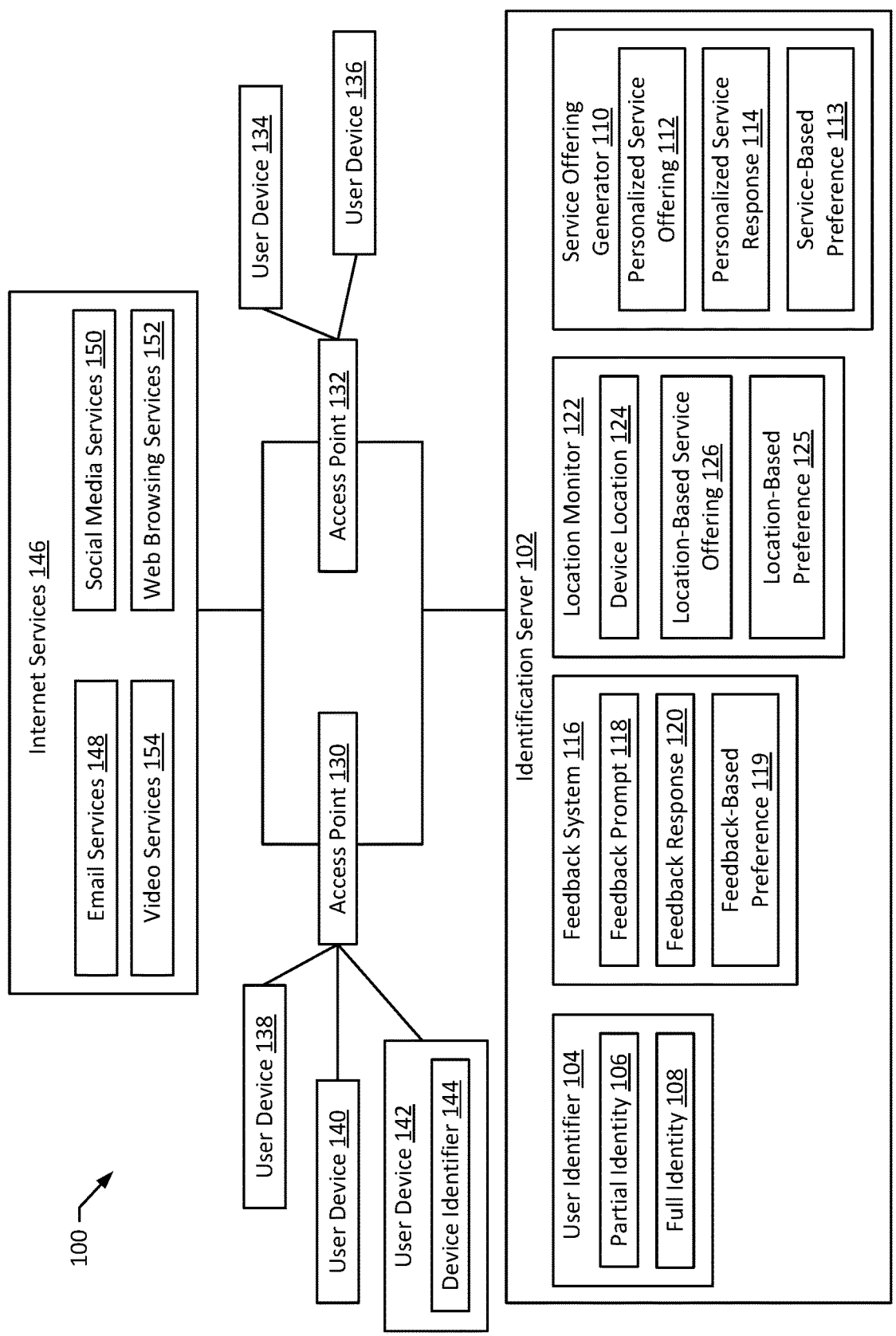
FIG. 1 illustrates a system according to an exemplary embodiment of the present disclosure.

The traditional model for collecting data on customers and their experiences in most circumstances is reactive. For example, companies may send emails after an interaction with a customer that includes a survey designed to help understand the customer's degree of satisfaction. Such contacts can often occur days or weeks after the interaction, so the customer may lack sufficient context and memory of the interaction to provide proper feedback. Such implementations are typically insufficient to gather sufficient customer, customer preference, and customer experience information. First, many customers do not respond to the reactive communications because, e.g., too much time has passed since the interaction or inconvenience. Second, because the surveys are self-reported, customer insights may be statistically biased, inaccurate, or incorrect. Not having sufficient customer information can complicate marketing, sales, and operational aspects of a business. For example, if a hotel is unable to accurately gauge their target market they will be unable to properly plan, e.g., hotel décor, menu items, marketing efforts, and service offerings.

Further, even customers that do not respond to these requests for feedback may still post negative reviews on review sites (e.g., Yelp®) and social media websites (e.g., Facebook®, Twitter®, or Instagram®). These negative reviews may center around negative experiences the customer had with the business (e.g., bad service at a restaurant, issues with a hotel room). The typical methods for reporting these issues may be cumbersome or inconvenient for the customer. For example, a customer may have to call management in the moment to have a problem addressed or may have to file a complaint after the fact. Because of the effort required, customers with small or moderate problems may not seek to have them addressed but may still mention the problems in an online review. Such problems may then often reoccur with each customer visit to the business.

One solution to these problems is to gather information about a customer's interactions with the business in real time. For example, many companies businesses offer, wireless network services (e.g., access to Wi-Fi networks) to customers. Customer interactions with these wireless network services may be used to build an identity of the customer. For example, when a user device first connects to a wireless network offered by a company, a partial identity of the user may be generated based at least in part on the user device connecting to the network. The user's subsequent interactions with the business and the network may be subsequently monitored (e.g., network or device usage patterns) in order to enhance the partial identity and gain additional knowledge about the user. Depending on how a system is configured, the monitoring may typically be performed on an opt in basis.

In addition to collecting data and information on customers, wireless networking solutions may also be used to foster improved feedback from customers. For example, a wireless networking system may be configured to proactively solicit feedback on the customer experience while the customer is still in the venue and intelligently routes the feedback and accompanying customer location and customer context to the front-line team members of the business to resolve.

In both instances, the customer data and/or customer feedback may be enhanced with location data regarding the user. For example, the user's location within a facility run by a company may be monitored using network access points (e.g., geofenced areas around access points). This location data may be incorporated into the customer data (e.g., as preferences derived from the user's location) and/or the customer feedback (e.g., as services utilized by the user). Location information may also be used to more precisely identify the user (e.g., to determine a room number within a hotel and a corresponding reservation).

FIG. 1 depicts a system 100 according to an exemplary embodiment of the present disclosure. The system 100 may be configured to provide wireless networking and internet services to a plurality of user devices while also determining partial or full identities of users associated with the user devices and/or soliciting feedback from the users. The system 100 includes an identification server 102 connected to access points 130, 132 configured to provide access to a plurality of internet services 146 for user devices 138, 140, 142, 134, 136. The identification server 102 includes a user identifier 104 storing a partial identity 106 and the full identity 108, a feedback system 116 storing a feedback prompt 118 and a feedback response 120, a service offering generator 110 storing a personalized service offering 112 in a personalized service response 114, and a location monitor 122 storing a determined location 124 and a location-based service offering 126. The internet services 146 may include email services 148, social media services 150, video services 154, and web browsing services 152. The user device 142 includes a device identifier 144.

One or more components of the system 100 may be implemented by a computer system. For example, one or more of the identification server 102, the access points 130, 132, and the user devices 134, 136, 138, 140, 142 may include a processor and/or a memory responsible for implementing one or more operational features of these components. In particular, the memory may store instructions which, when executed by the processor, cause the processor to execute one or more operational features of these components.

The access points 130, 132 may cooperate to form a wireless network within a service area (e.g. a facility provided by a business). For example, the access points 130, 132 may form a wireless network that connects to the internet and related internet services 146. In certain implementations, the access points 130, 132 may be controlled by a wireless network controller (e.g., a W-Fi controller). The access points 130, 132 may be configured to interface with the user devices 134, 136, 138, 140, 142 and order provide access to the internet services 146 to the user devices one through four, 136, 138, 140, 142. The user devices 134, 136, 138, 140, 142 may be implemented by one or more computing devices, e.g., a smart phone, tablet device, laptop, internet of things device, or computer-equipped vehicle. In allowing the user devices 134, 136, 138, 140, 142 access to the internet services 146, the access points 130, 132 may require certain information regarding the associated user or user device 136, 134, 138 140, 142. For example, the user device 142 includes a device identifier 144 (e.g., a MAC address of the user device) which may be provided to the access point 130, 132 on negotiating access to the internet services 146. The device identifier 144 may be exchange with the access points 130, 132 according to a protocol (e.g., a W-Fi-based protocol). Although not depicted, the user devices 134, 136, 138, 140 may also store device identifiers similar to the device identifier 144 for exchange with the access points 130, 132.

The identification server 102 may be configured to determine an identity (e.g., a partial identity 106 and/or a full identity 108) of users associated with the user devices 134, 136, 138, 140, 142 connected to the access points 130, 132. For example, the user identifier 104 may be configured to determine a partial identity 106 and/or a full identity 108 for the users. In determining the identities 106, 108, the user identifier 104 may monitor one or more network activities of the user devices 134, 136, 138 140, 142, as explained in greater detail below.

The feedback system 116 may be configured to request feedback from the users via the user devices 134, 136, 138, 140, 142. For example, the feedback system 116 may generate a feedback prompt 118 and may transmit the feedback prompt 118 to the user devices 134, 136, 138 140, 142 via the access points 130, 132. The feedback prompt 118 may be generated based on an identity 106, 108 of the user associated with a given user device 134, 136, 138, 140, 142. For example, if the user is well known to the business (e.g., the identity 106, 108 includes more detail regarding the user) the feedback prompt 118 may be tailored to match that user's experience. In particular, if the system 100 is provided by a hotel and the user is identified as a regular visitor to the hotel, the feedback prompt 118 may be generated to request feedback on specific aspects of the user's experience (e.g., experience at a particular restaurant offered by the hotel), or to request feedback compared to previous stays by the user. In certain implementations, the feedback system 116 may transmit the feedback prompt 118 responsive to detecting the user device 134, 136, 138 140, 142 connecting to the access point 130, 132. The feedback prompt 118 may request feedback regarding a user's experience so far with a business providing the access points 130, 132 (e.g., a hotel, restaurant, bar, store). If the user response to the feedback prompt 118 is received on the user device 134, 136, 138 140, 142, the feedback system 116 may receive feedback response 120 from the user device 134, 136, 138 140, 142. The feedback system 116 may then process the feedback response 120. For example, if the feedback response 120 indicates a negative experience for the user, the feedback system 116 may route information regarding the feedback response 120 to a management team of the business that the business can address the user's issues. For example, if a hotel guest is unhappy with accommodations in their room, management team may be alerted to take corrective action (e.g., offering a new room or solving the user's underlying issue with a current room). Additionally, based on the feedback response 120, the feedback system 116 may determine a feedback based preference 119 of a user associated with the user device 134, 136, 138 140, 14 to the provider the feedback response 120. The feedback based preference 119 may then be used to update an identity of the user (e.g., the partial identity 106 of the user).

The service offering generator 110 may be configured to generate a personalized service offering 112 based on an identity of a user, such as a partial identity 106 of the user. The service offering generator 110 may then provide the personalized service offering 112 to the user devices 134, 136, 138 140, 142. For example, the service offering generator 110 may provide the personalized service offering 112 to the user devices 134, 136, 138 140, 142 via a local area connection with the access point 130, 132 or via an internet connection enabled by the access point 130, 132. In other implementations, the user device 134, 136, 138, 140, 142 may receive the personalized service offering 112 via a separate internet connection. The personalized service offering 112 may be provided according to a preferred indication medium of a user associated with the user device 134, 136, 138 140, 142. For example, the partial identity 106 may indicate that the user prefers email communications or text message communications. Accordingly, the service offering generator 110 may provide the personalized service offering 112 via the preferred communication channel. The service offering generator 110 may then receive a personalized service response 114 from the user device 134, 136, 138, 130, 142, which indicates a response of the user to the personalized service offering 112. The service offering generator 110 may then process the personalized service response 114. For example, if the user accepts the personalized service offering 112, the service offering generator 110 may forward the personalized service response 114 to the appropriate system for processing. In certain implementations, the service offering generator 110 may determine a service-based preference 113 based on the user's response to the personalized service offering 112. The service-based preference 113 can then be used update the partial identity 106 by the user identifier 104.

The location monitor 122 may be configured to monitor the location of the user devices 134, 136, 138, 140, 142. For example, the location monitor 122 may monitor the location of the user devices 134, 136, 138, 140, 142 within a facility associated with the access points 130, 132 over time. The location monitor 122 may estimate a device location 124 for one or more of the user devices 134, 136, 138, 140, 142. For example, the location monitor 122 may estimate the location of a user device 134, 136, 138, 140, 142 based on a signal strength between the user device 134, 136, 138, 140, 142 and an access point 130, 132. Based on the device location 124, the location monitor 122 may determine a location-based service offering 126 for the user. The location monitor 122 may then determine a location-based preference 125 for the user based on the location-based service offering 126.

The internet services 146 as depicted includes email services 148, social media services 150, video services 154, and web browsing services 152. The email services 148 may include accessing email provided by, e.g., a corporate exchange email server, or other web-provided email services (e.g., Outlook®, Exchange®, Gmail®). The social media services 150 may include connecting to social media platforms such as Facebook®, Twitter®, and Instagram®. The video services 154 may include providing the ability to connect to one or more online video platforms, such as YouTube®, Netflix®, and Hulu®. The web browsing services 152 may include the ability to connect to other internet websites, such as news sites, entertainment sites, or other internet services. Although the internet services 146 include email services 148, social media services 150, video services 154, and web browsing services 152 as depicted, it should be appreciated that additional services provided over the internet may similarly be included in certain implementations.

Figure 2A:
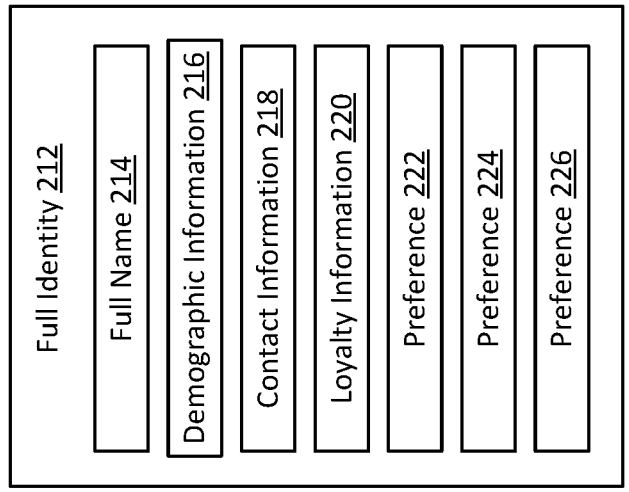
FIG. 2A illustrates identities according to exemplary embodiments of the present disclosure.
Figure 2A:
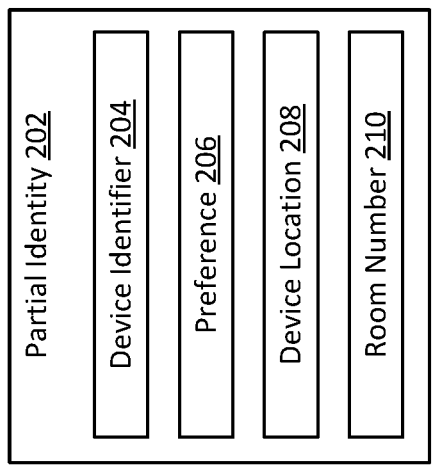

FIG. 2A depicts identities 200 according to an exemplary embodiment of the present disclosure. The identities 200 include a partial identity 202 and a full identity 212. In certain implementations, the identities 200 may represent identities generated by the user identifier 10 for the system 100. For example, the partial identity 202 may be an implementation of the partial identity 106 and the full identity 212 may be an implementation of the full identity 108. The identities 202, 212 may comprise any sets of information that forms a consistent and repeatable indicator of an individual user. The system 100 may utilize identity such as the identities 202, 212 to determine and store user characteristics for future purposes (e.g., marketing, sales, design purposes). The level to which an individual user has been identified in a given identity 202, 212 may depend on the level to which the user and an associated user device 134, 136, 138 140, 142 has interacted with the system 100. A brand-new user entering a facility interacting with a company for the first time may be unidentified. For example, when an individual first enters a hotel, they may be unidentified. The hotel may not be able to determine whether the individual has an existing relationship with the hotel. For example, the individual may be staying in the hotel, or may be entering the hotel to take advantage of other amenities (e.g., restaurants, bars). Because the individual is not identified, the hotel may not be able to determine marketing information or service recommendations for the individual.

However, after certain interactions with a facility or business, an individual may be partially identified and may accordingly have a partial identity 202 stored within an identification server 102 associated with the facility or business. For example, after an unidentified individual enters a hotel, the individual may join a wireless network provided by the hotel (e.g., access points 130, 132 provided by the hotel). Upon connecting to the network, the individual may be presented (e.g., via their user device 134, 136, 138 140, 142) with a captive portal that requests information before allowing access to the internet services 146. For example, the captive portal may request one or more of a room number, phone number, or email address. The access point 130, 132 may also capture one or more device identifiers 144 of the user device 134, 136, 138, 140, 142 when allowing access to the internet services 146.

Any captured information may then be used to create the partial identity 202. In particular, the partial identity 202 includes the device identifier 204, which may reflect the device identifier 144 received from the user device 134, 136, 138, 140, 142 and the room number 210 may reflect a room number in the hotel entered by the user to access the internet services 146. The access portal 130, 132 may also capture other information, including a device location 208 based on the relative location of the user device 134, 136, 138, 140, 142 to the access portal 130, 132. Further, as explained in greater detail below, the identification server 102 may determine a preference 206 of the user for inclusion within the partial identity 202.

Over time, the identification server 102 may determine enough information regarding the user to assemble a full identity 212 of the user. The full identity 212 may constitute a complete identity profile includes sufficient detail on an individual so as to be able to individually identify the user. For example, over time the identification server 102 may analyze network usage and/or location history of the user device 134, 136, 138, 140, 142 to detect additional preferences 224, 226 of the user. The identification server 102 may also determine a full name 214, demographic information 216, contact information 218, and loyalty information 220 of the user. In certain implementations, the user may provide this information to the identification server 102 (e.g., by logging into a platform hosted by the business providing the network). In other implementations, the identification server 102 may communicate with other systems of the business to determine the information. For example, the identification server 102 may provide the room number 210 to a customer resource management (CRM) system or property management system (PMS) of the hotel to determine the full name 214, demographic information 216, contact information 218, and loyalty information 220 of the user. For example, the loyalty information 220 may include a loyalty program membership number of the user and additional information regarding the user, such as user preferences (e.g., service preferences, communication preferences) or information regarding previous stays with the hotel. In still further implementations, the may determine one or more portions of the full identity 212 based on monitoring network activities, device locations 124, and/or personalized service responses 114.

In certain implementations, the partial identity 202 and/or the full identity 212 may not contain some of the information indicated in FIG. 2 and may additionally or alternatively contain further pieces of information. For example, the partial identity and/or the full identity 212 may contain one or more of a home address of the user, payment methods (e.g., credit cards) of the user, digital identifiers (e.g., social media usernames or identifiers), interests, and preferred entertainment platforms (e.g. Netflix, Amazon Prime etc.). These pieces of information may be directly provided by the user and/or may be derived by the identification server 102 based on detected network and/or user behavior.

Figure 2B:
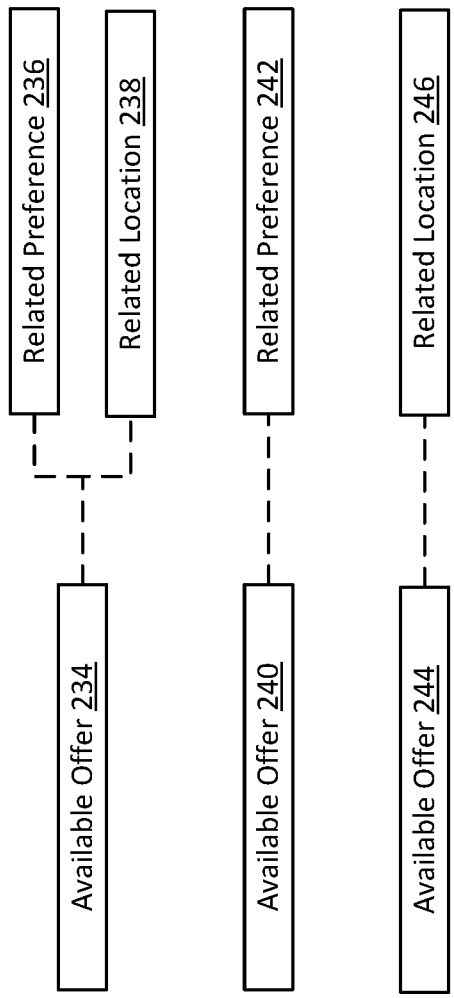
FIG. 2B illustrates offer generation associations according to exemplary embodiments of the present disclosure.

FIG. 2B depicts offer generation associations 230 according to exemplary embodiments of the present disclosure. The offer generation associations 230 may be an example implementation of an offer storage scheme utilized by the identification server 102 to generate service offerings. In particular, the location monitor 122 and/or the service offering generator 110 may utilize offer generations such as the offer generations 230 in generating, respectively, location-based service offerings 126 and personalized service offerings 112.

Offer generation may rely on available offers stored as state pairs, where an available offer 234, 240, 244 is correlated with one or more related preferences 236, 242 and/or related locations 238, 246. The location monitor 122 and/or service offering generator 110 may then analyze these state pairs against a partial or full identity 106, 108, 202, 212 to generate a location-based service offering 126 and/or a personalized service offering 112. For example, if a partial identity 106, 202 has been classified as a frequent business traveler, then based on the partial identity 106, 202 or network operations, a set of offers and preferences may be selected for presentation, and at least one of these made available to the user. The relationship of available offers 234, 240, 244 to related preferences 236, 242 may be determined by analyzing the available offers and related responses with a machine learning model or other correlation techniques. For example if a partial identity 106, 202 indicates that a user is a frequent business traveler and that the user regularly accesses fishing videos or fishing web sites, they may be offered a discount or other incentive to dine at a fish restaurant. In certain implementations, the state pairs may be stored in an offer repository communicatively coupled to the identification server 102. The offer repository may be made available to third parties such as other vendors (e.g., airlines, hospitality providers).

The offer generation associations 230 include available offers 234, 240, 244. The available offers 234, 240, 244 may represent offers generated for one or more businesses. For example, in certain implementations, a business may provide the available offers 234, 240, 244 to the identification server 102 for offering to customers on behalf of the business. In certain implementations, the available offers 234, 240, 244 may be manually generated (e.g., by marketing staff and/or sales staff of the business). In other implementations, the available offers 234, 240, 244 may be automatically generated (e.g., based on customer trends, sales trends).

The offer generation associations 230 also include related preferences 236, 242 and related locations 238, 246. The related preferences 236, 242 may identify one or more user preferences that may indicate that the available offer 234, 240 may be of interest to the corresponding user. For example, in generating personalized service offerings 112, the service offering generator 110 may analyze the preferences 206, 222, 224, 226 of an identity 106, 108, 202, 212 for corresponding related preferences 236, 242 of available offers 234, 240. The related locations 238, 246 may identify locations within a facility which may correspond to interested users or customers. For example, in generating location-based service offerings 126, the location monitor 122 may analyze a device location 208 of an identity 202, 212 for a location near a related location 238, 2467 available offer 234, 244. In certain implementations, the related preferences 236, 242 and related locations 238, 246 may be manually provided (e.g., based on the location of a corresponding business, or one or more characteristics identified by marketing or sales staff). In other implementations, the related preferences 236, 242 and related locations 238, 246 may be automatically generated (e.g., by a machine learning model trained to analyze past user behavior when presented previous offers). For example, the machine learning model may identify similar locations, such as nearby locations, locations with a similar function (e.g., other clothing stores), and locations associated with similar preferences (e.g., hotel rooms with a desirable view).

User preferences 206, 222, 224, 226 may be determined through use of host-provided systems, such as wireless networks implemented by access points 130, 132, in-room or in-seat display systems and other user-initiated uses of host-provided services. The preferences 206, 222, 224, 226 may be classified on one or more scalars, such that a user may like or dislike a specific item. For example, a user may have a high degree of positive preference for having a room facing away form the main road, which could be represented as:

<Preference Type:
(room orientation
to main road=facing
>

In this example a scalar associated with the preference 206, 222, 224, 226 may indicate a strength of the preference and may range from positive 1 to negative 1, with 0 indicating a neutral preference, negative 1 indicating a strong negative preference, and positive 1 indicating a strong positive preference. Such preferences 206, 222, 224, 226 may be determined through calculation, direct user feedback or analysis of behavior patterns. In some embodiments a splash screen may request user input as to their room preferences, or response to the room provided.

The available offers 234, 240, 244 may include one or both of a related preference 236, 242 and related location 238, 246. For example, the available offer 234 includes both a related preference 236 and a related location 238. By contrast, the available offer 240 only includes a related preference 242 and the available offer 2440 may include related location 246. In certain implementations, the available offers 234, 240, 244 may include more than one related preference 236, 242 and/or more than one related location 238, 246.

Figure 2C:
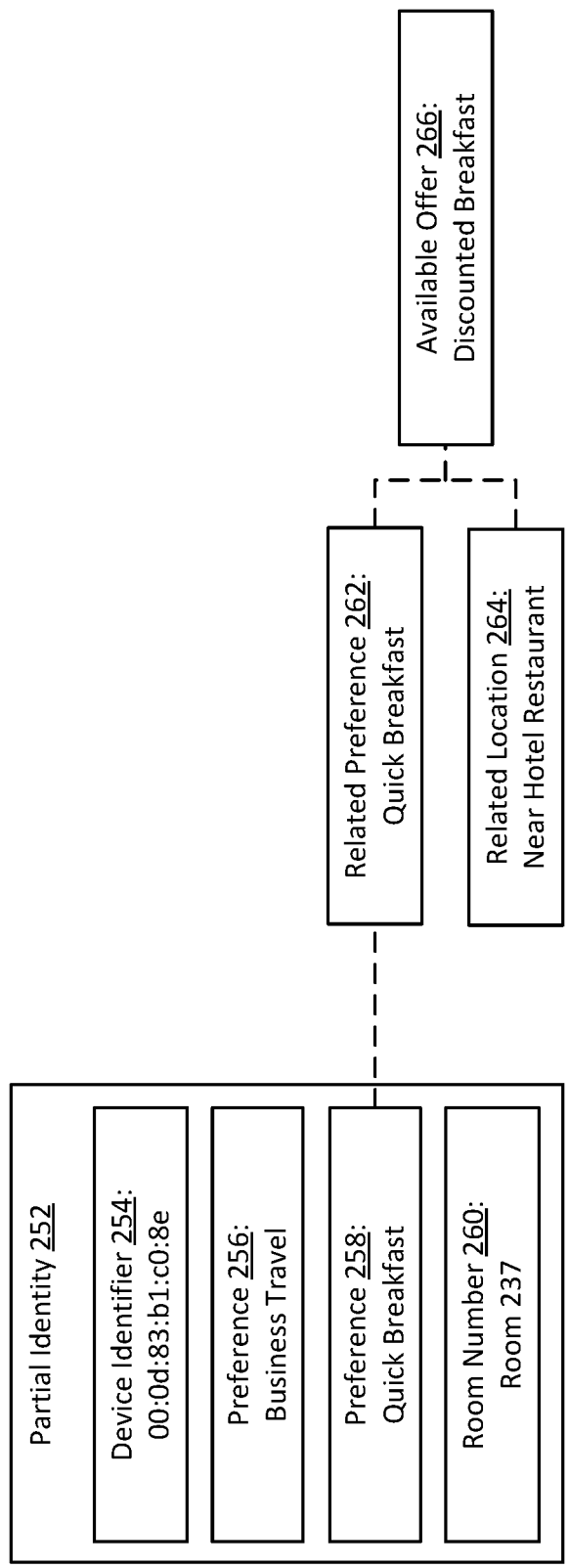
FIGS. 2C, 2D and 2E illustrate generated offers according to exemplary embodiments of the present disclosure.
Figure 2D:
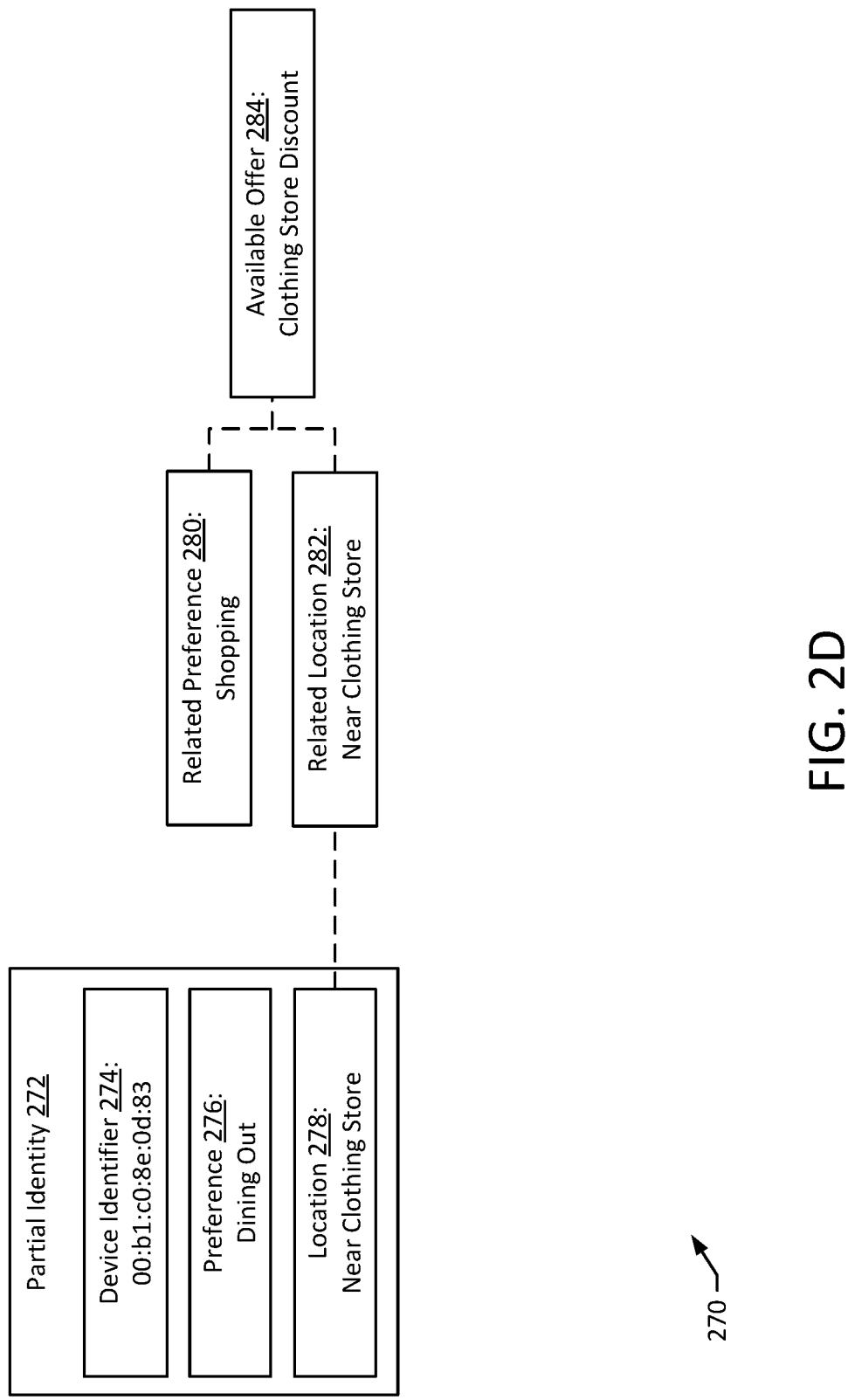

FIGS. 2C and 2D depict generated offers 250, 270 according to exemplary embodiments of the present disclosure. The generated offers 250, 270 depict offers generated between partial identities 252, 272 and available offers 266, 284. In the generated offer 250, the partial identity 252 includes a device identifier 254, preferences 256, 258 and a room number 260. The partial identity 252 may corresponds to, e.g., a customer or guest within a hotel. The device identifier 254 may indicate a MAC address of the customer's user device 134, 136, 138, 140, 142 and the room number 260 may correspond to the customer's room within the hotel. The preferences 256, 258 may indicate one or more preferences determined based on network activity of the customer's user device 134, 136, 138, 140, 142 and/or the location of the user device 134, 136, 138, 140, 142 within the hotel as determined by one or more access points 130, 132 located within the hotel. For example, the customer may primarily use wireless networking services provided by the hotel during morning and evening hours, which may indicate that the customer is on business travel and accordingly out of the hotel during the day. Therefore, the user identifier 104 may identify a preference 256 for business travel for the customer. Based on the preference 256, the user identifier 104 may also add one or more associated preferences to the partial identity 252. For example, the user identifier 104 may store an associated preference indicating that business travelers typically prefer quick breakfast options are staying in a hotel. Accordingly, the user identifier 104 may add the preference 258 to the partial identity 252.

The available offer 266 includes an offer for a discounted breakfast, such as a discounted breakfast within a restaurant within the hotel. The available offer 266 includes a related preference 262 and a related location 264. The related preference 262 indicates that customers who prefer quick breakfasts are likely to take interest in the available offer 266. The related location 264 indicates that customers located near the hotel's restaurant are also likely to take interest in the available offer 266. The available offer 266 may be one of a plurality of available offers stored within the identification server 102. To select between the plurality of available offers, the service offering generator 110 may compare the preferences 256, 258 of the partial identity 252 with the related preferences 262 of each available offer. In performing this comparison, the service offering generator 110 may identify that the preference 258 corresponds with the preference 262 and that both indicate a quick breakfast option preference. Based on this association, the service offering generator 110 may identify the available offer 266 for inclusion within a personalized service offering 112.

The service offering generator 110 may then present the available offer 266 to the user via personalized service offering 112. In addition to the available offer 26, the personalized service offering 112 may include additional personalizing information, such as the customer's name and may be sent along a preferred communication medium. The customer may then respond to the personalized service offering 112 via a personalized service response 114 (e.g., accepting or denying the personalized service offering 112). Based on the personalized service response 114, the service offering generator 110 may update the partial identity 252. For example, if the customer rejects the available offering 266 for a discounted breakfast, the service offering generator 110 may identify the preference 258 for a quick breakfast as a service-based preference 113 and may add a negative indication of the service-based preference 113 to the partial identity 252. For example, the service offering generator 110 may remove the preference 258 and the partial identity 252. In other examples, the service offering generator 110 may add additional preferences to the partial identity 252 (e.g., preferences indicating a negative inclination towards eating breakfast at restaurants or towards eating in hotel restaurants).

The generated offer 270 similarly includes a partial identity 272 with a device identifier 274 indicating a MAC address of a user device 134, 136, 138, 140, 142 associated with the customer. The generated offer 270 also includes an available offer 284 providing a discount at a clothing store, such as a clothing store located within a shopping mall. The partial identity 262 indicates a preferences 276 for dining out, which may determined based on networking activities of the user device 134, 136, 13, 140, 142 (e.g., browsing web services offered by Yelp® and/or OpenTable®) on a network provided by the shopping mall. The partial identity 272 also includes a location 278 of the customer, indicating that the customer is near a clothing store within the shopping mall. The location 260 may be determined by the location monitor 122 based on one or more signal strength measurements between access points 130, 132 within the shopping mall and the customer's user device 134, 136, 138, 140, 142. The available offer 284 includes a related preference 280 indicating that the available offer 274 may be relevant to customers who enjoy shopping and a related location 282 indicating that the available offer 284 may be relevant to customers near the clothing store.

In generating a location-based service offering 126, the location monitor 122 may compare locations 268 from partial identities 262 against related locations 282 of available offers 284 and may identify as relevant those available offers 284 that include nearby related locations 282. For example, the partial identity 272 includes a location 278 that corresponds to the related location 282 of the available offer 284, in that both locations 278, 282 are near the clothing store. Accordingly, the location monitor 122 may select the available offer 234 for inclusion within a location-based service offering 126. Similar to the service offering generator 110 above, the location monitor 122 may update an indication of a location-based preference 125 within an associated partial identity 262 based on a user response to the location-based service offering 126. For example, if the customer accepts the available offer 284, the location monitor 122 may identify the related preference 2804 shopping as a location-based preference 125 may add a positive indication of the preference 280 to the partial identity 272. Specifically, the location monitor 122 may add an additional preference to the partial identity 262 indicating that the corresponding customer is receptive to shopping-based offers.

Figure 2E:
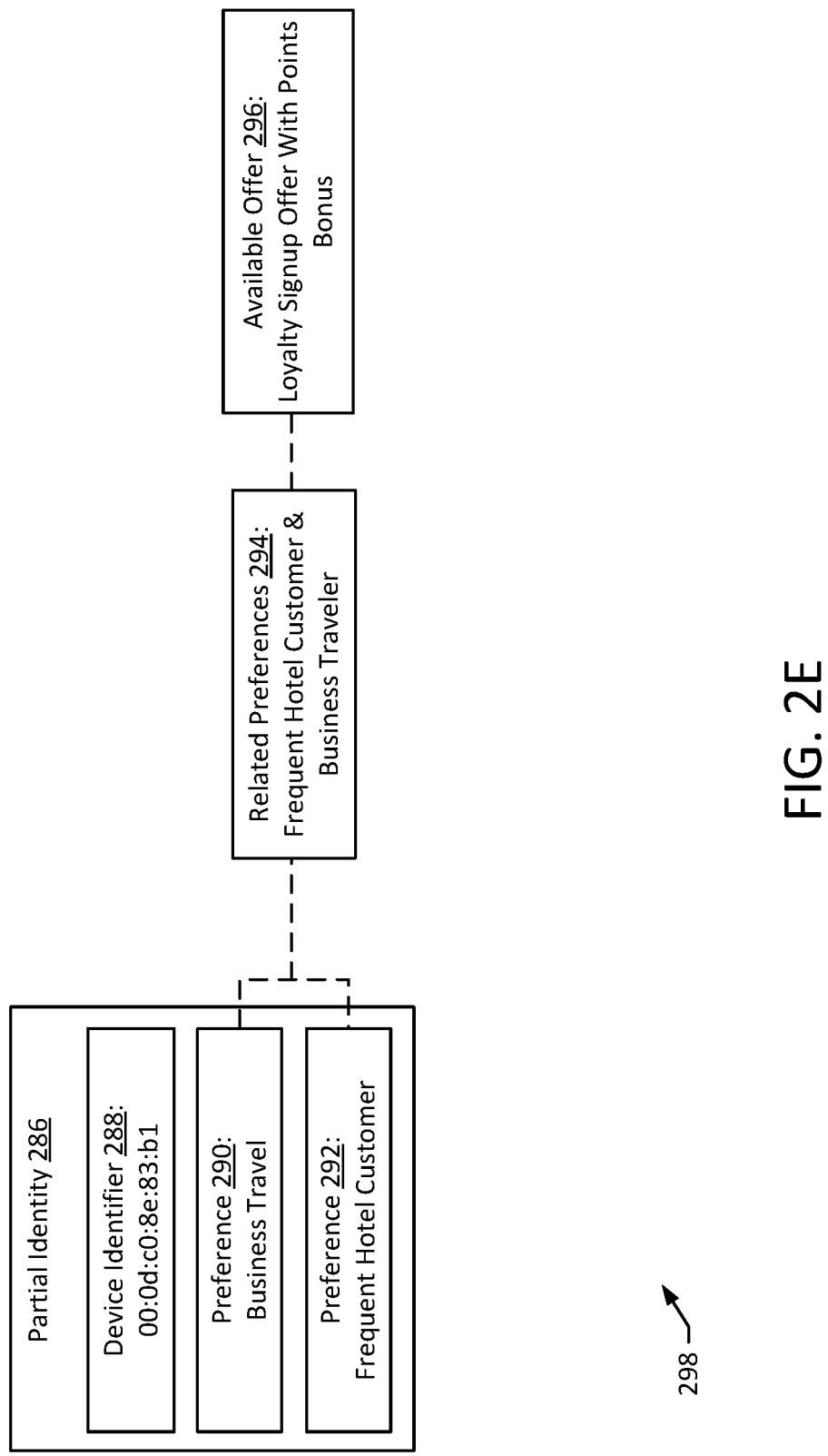

The generated offer 298 also includes a partial identity 286 with a device identifier 288 storing a user device MAC address and preferences 290, 292 indicating that the associated user is a business travel and a frequent hotel customer. Notably, the partial identity 286 does not include loyalty information, indicating that the user device has not been associated with a hotel loyalty account. The available offer 296 prompts a user to sign up with the hotel's loyalty program and incentivizes them to do so with a points bonus. The related preferences 294 indicate that the available offer 296 may be most relevant to frequent hotel customers and business travelers. In generating the offer 298, the service offering generator 110 may compare the related preferences 294 with the preferences 290, 292 indicating that the associate user is likely a match. However, before generating the offer, the service offering generator 110 may further determine whether there is loyalty information associated with the partial identity 286. If there is associated loyalty information, the available offer 296 is irrelevant. However, as indicated in FIG. 2E, the partial identity 286 has no associated loyalty information, so the service offering generator 110 may generate the generated offer 298 offering the available offer to the user (e.g., via a personalized service offering).

Figure 3:
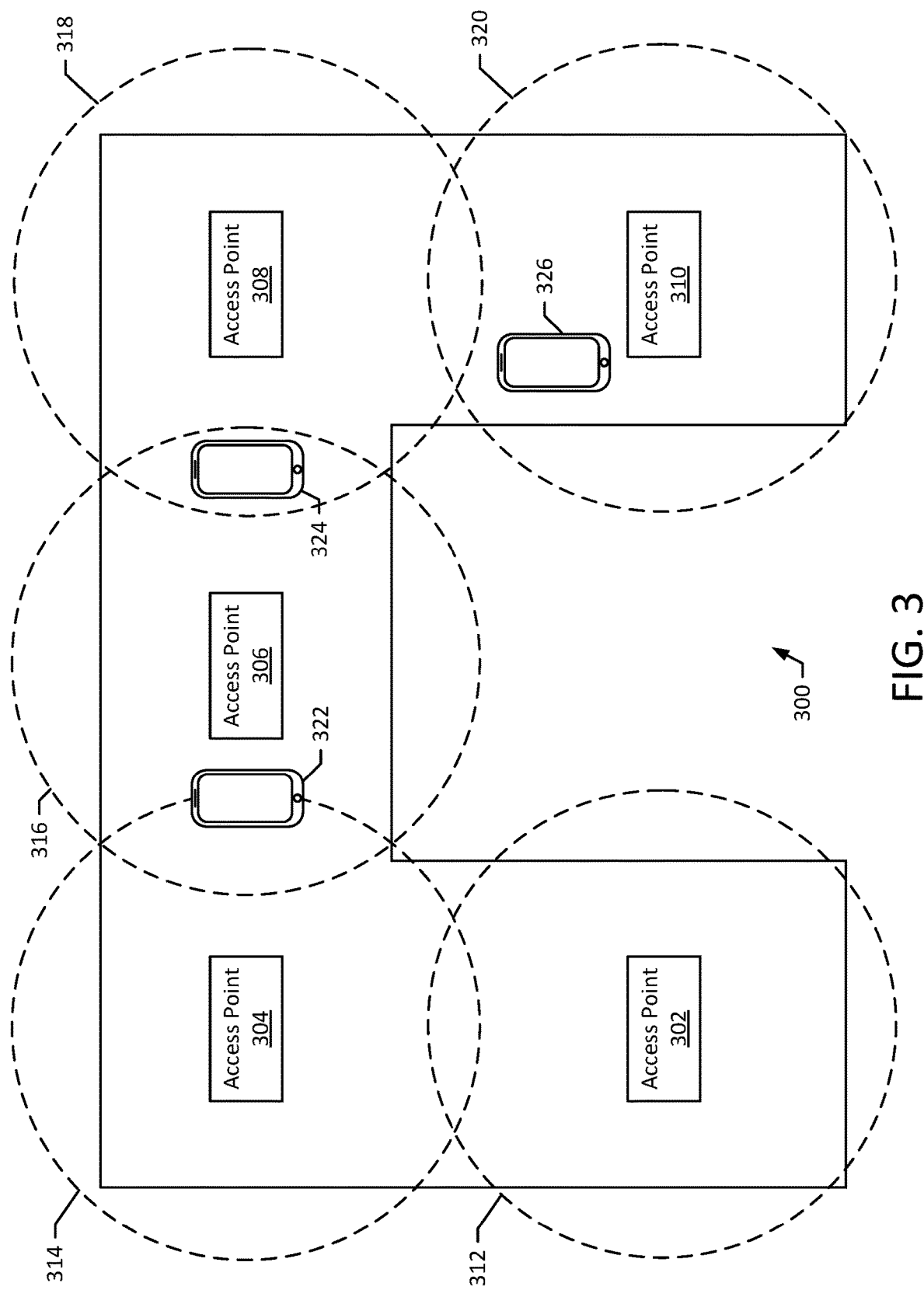
FIG. 3 illustrates a facility according to an exemplary embodiment of the present disclosure.

FIG. 3 depicts a facility 300 according to an example embodiment of the present disclosure. The facility 300 may correspond to a company implementing a system 100. For example, the facility 300 may correspond to, e.g., a store, hotel, and/or shopping mall. The facility 300 includes a plurality of access points 302, 304, 306, 308, 310, which may implement a wireless network within the facility 300. For example, the access points 302, 304, 306, 308, 310 may provide access to one or more internet services. Each of the access points 302, 304, 306, 308, 310 has a corresponding service area 312, 314, 316, 318, 320. The service area 312, 314, 316, 318, 320 may represent the range over which the access points 302, 304, 306, 308, 310 can reliably communicate for the purposes of implementing the wireless network.

The facility 300 also includes multiple user devices 322, 324, 326, which may correspond individual users. For example, where the facility 300 is an implementation of a shopping mall, the user devices 322, 324, 326 may correspond to customers within the shopping mall. The system 100 may be configured to track device locations 124 of the user devices 322, 324, 326 within the facility 300 (e.g., using the location monitor 122). For example, the facility 300 may utilize geofenced areas within the facility that are delimited by the service areas 312, 314, 316, 318, 320 of the access points 302, 304, 306, 308, 310. In particular, the location monitor 122 may determine that the user devices 322, 324, 326 are in the geofenced area delimited by the service area 312, 314, 316, 318, 320 of the closest access point 302, 304, 306, 308, 310. As depicted, for instance, the user device 326 is in the geofenced area corresponding to the service area 320 because the user device 326 is located within the service area 320 of the access point 310. Similarly, although the user device 322 overlaps the service areas 314, 316, the location monitor 122 may determine the device location 124 of the user device 322 as within the geofenced area corresponding to the service area 316, as the user device 322 is closer to the access point 306 than the access point 304. In instances where the user device is approximately the same distance from two access points, the location monitor 122 may determine that the device location 124 is the service area most-recently occupied by the user device. For example, the user device 324 is located the same distance from the access points 306, 308. If the user device 324 was previously in the geofenced area corresponding to service area 316 and is moving towards the geofenced area corresponding to service area 318, the location monitor 122 may determine that the device location 124 of the user device 324 is the geofenced area corresponding to service area 316. Alternatively, in such instances, the location monitor 122 may determine that the device location 124 is located in the geofenced area corresponding to service area that the user device is newly entering. In such implementations, in the preceding example, the location monitor 122 may instead determine that the device location 124 of the user device 324 is the geofenced area corresponding to service area 318.

Figure 4:
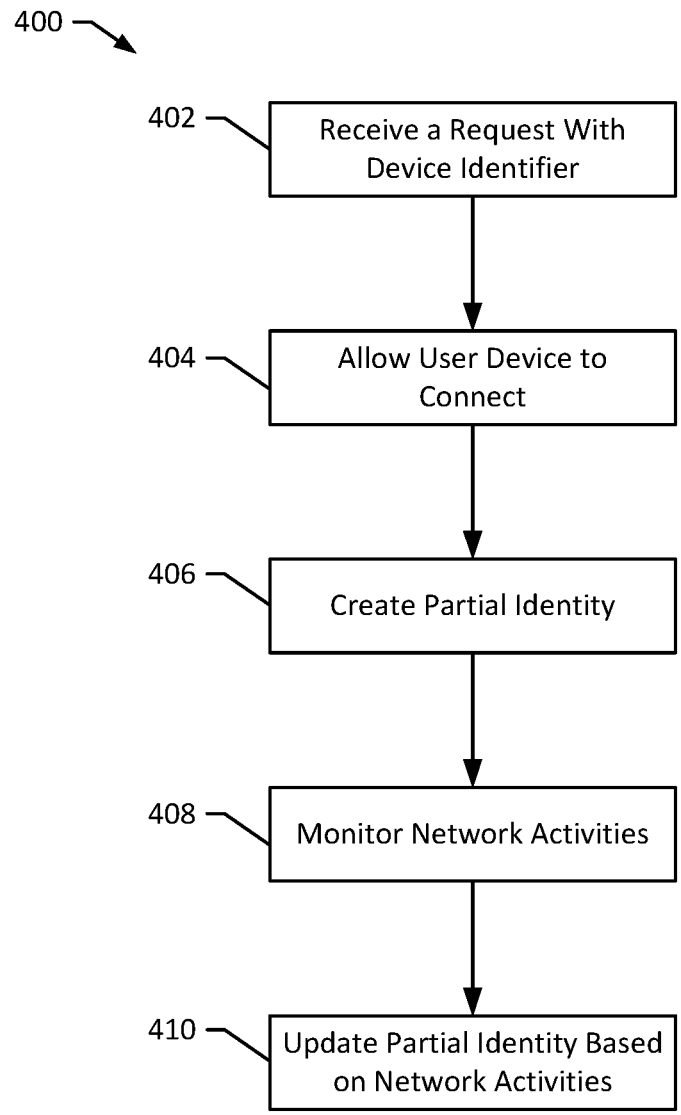
FIG. 4 illustrates a method according to an exemplary embodiment of the present disclosure.

FIG. 4 depicts a method 400 according to an example embodiment of the present disclosure. The method 400 may be performed to create and update a partial identity 106, 202 corresponding to a user device 134, 136, 138, 140, 142, 322, 324, 326. The method 400 may be performed by a computer system, such as the system 100, including the access points 130, 132, identification server 102, and/or the user identifier 104 of the system 100. The method 400 may also be implemented by a set of instructions stored on a computer readable medium that, when executed by a processor, cause the computer system to perform the method. For example, all or part of the method 400 may be implemented by a processor and a memory responsible for implementing one or more features of the access points 130, 132 and/or the identification server 102. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method begins with the access point 130, 132, 302, 304, 306, 308, 310 receiving a request to access a network that includes a device identifier 144 (block 402). For example, a user device 134, 136, 138, 140, 142, 322, 324, 326 may transmit a request to the access point 130, 132, 302, 304, 306, 308, 310 in order to access one or more internet services 146 and may transmit the request such that it includes the device identifier 144.

After receiving the request, the access point 130, 132, 302, 304, 306, 308, 310 may proceed to allow the user device 134, 136, 138, 140, 142, 322, 324, 326 access to the network and/or associated internet services 146 (block 404). In certain implementations, the access point 130, 132, 302, 304, 306, 308, 310 may grant access without receiving further information. In other implementations, the access point 130, 132, 302, 304, 306, 308, 310 may present a captive portal into which the user has to enter one or more pieces of information (e.g., a room number, email,), as described above. Additionally or alternatively, the user may be able to access the network after logging into a user account affiliated with the company implementing the system 100, or by logging into a social media account. Authorization of the user may be implemented a user authentication protocols such as the Open Authorization (OAuth) protocol. In certain implementations, after providing sufficient information, the feedback system 116 may present a feedback prompt 118 via the captive portal.

The user identifier 104 may then create a partial identity 106, 202, 252, 272 for the user associated with the requesting user device 134, 136, 138, 140, 142, 322, 324, 326 (block 406). In particular, the user identifier 104 may create the partial identity 106, 202, 252, 272 to include at least the device identifier 144 received from the user device 134, 136, 138, 140, 142, 322, 324, 326. In certain implementations, the user identifier 104 may encrypt or otherwise protect the privacy of the device identifier 144. Additionally, in implementations where the access portal 130, 132, 302, 304, 306, 308, 310 presents a captive portal to request additional information, the user identifier 104 may also include the additional information received via the captive portal.

In creating the partial identity 106, 202, the user identifier 104 may collect the initial information (i.e., the device identifier and information received via the captive portal) and may assign the partial identity 106, 202 a unique identifier and may store the partial identity 106, 202, 252, 272 in a repository (e.g., a repository communicatively coupled to the identification server).

The identification server 102 may then monitor the networking activities of the user device 134, 136, 138, 140, 142, 322, 324, 326 (block 408). For example, the identification server 102 may observe and record one or more aspects of the networking communications between the user device 134, 136, 138, 140, 142, 322, 324, 326 and the internet services 146. The identification server 102 may then store an indication of the networking communications in connection with the partial identity 106, 202, 252, 272 for future analysis. In particular, each interaction between the user device 134, 136, 138, 140, 142, 322, 324, 326 and the internet services 146 may be portioned into discrete events (e.g., events based on time, actions, and operations of one or more of the user device 134, 136, 138, 140, 142, 322, 324, 326 and the identification server 102). Each discrete event may then be stored in connection with the partial identity 106, 202, 252, 272 (e.g., in a graph database). The stored events may indicate certain attributes, such as time, location, an access point 130, 132, 302, 304, 306, 308, 310 identifier, the device identifier 144, and an indication of the partial identity 106, 202, 252, 272.

In certain implementations, the monitored networking communications may include one or more of the DNS operations involved in the communications, quantities of data transferred, incoming and outgoing data transfers and timing, connections to social networks where a social network identity is used to authenticate the user, and connections to email servers over recognizable ports. For example, a software layer of the access points may include a local DNS server that performs IP address and domain mapping services. The access points 130, 132 may then capture the information on a per-device basis and provide the information to the identification server 102.

The user identifier 104 may then update the partial identity 106, 202, 252, 272 based on the monitored network activities (block 410). For example, the user identifier 104 may analyze the monitored networking activities for one or more patterns indicating certain features and/or preferences of the user. In particular, the user identifier 104 may use one or more machine learning models to perform this analysis.

For example, after connecting to the internet services 146 via the access point 130, 132, 302, 304, 306, 308, 310, the user device 134, 136, 138, 140, 142, 322, 324, 326 may undertake a set of actions, for example they may visit social media feeds, view specific websites, process email or utilize one or more applications (e.g., applications for interactive communication, asynchronous communication, restaurant or business reviews, transportation, and/or entertainment). The user identifier 104 may determine that one or more of these uses of the internet services 146 has a specific communication signature. For example, the internet services may have a signature represented at least in part by indicators such as a domain name system (DNS) lookup, mail exchange (MX) record look up, or another lookup. The user identifier may parse these indicators to determine an underlying pattern of the communications associated with one or more internet services 146. These detected usage patterns of the internet services 146 may then be added to the partial identity 106, 202, 252, 272.

Usage patterns may be determined within over specified time period of any duration and may include an associated start and end time. The start time may be initiated by an event, such as a connection to a network or network service, and the end time may be determined by a further event, for example disconnection from a network or network service. The duration may also be set based on a proximity of the user device 134, 136, 138, 140, 142 to a geofenced location. For example, the start and end time may correspond to when the user device 134, 136, 138, 140, 142 enters and exits the geofenced location and any monitoring of the user device 134, 136, 138, 140, 142 network activities may be limited to the times at which the user device 134, 136, 138, 140, 142 is within the geofenced location. In further implementations, if a user opts in to additional monitoring, then further services may be offered at differing times and locations.

As further explained below, robust partial identities 106, 202, 252, 272, 298 may enable improved user recognition across multiple devices. The evaluation of consistent usage patterns established at one or more locations may recognizable patterns and behavioral associations. These attributes may be expanded and/or extended through further user interactions actions over time, which may include connecting to an access point 130, 132 and the characteristics of that connection (e.g. traffic analysis).

Certain determined preferences 206, 256, 258, 276, 290, 292 may have associated at least one threshold of sufficiency, prior to storage within an identity 106, 108, 202, 212, 252, 272, 286. If sufficient, a pattern may subsequently be used as a postulate and tested against historical, current and future patterns of this and other users to establish a quality measure of a pattern and/or identity information of that user. This quality measure may then be used by the user identifier 104 when determining whether to monitor for similar patterns in the future.

In certain implementations, after a user device 134, 136, 138, 140, 142 establishes a connection with an access point 130, 132 implementing a wireless network, the user device 134, 136, 138, 140, 142 may undertake a series of operations in any order. For example, the user device 134, 136, 138, 140, 142 may initially connect to an email server by sending the email server address, for example "htts://mail.server-.com," which may be recognized as a mail server, as may, for example, "gmail.com," "hotmail.com" and the like, by parsing a DNS record associated with the request to connect.

In certain implementations, the network activities may be stored with time indications of the associated activities. The user identifier 104 may then analyze internet usage patterns to determine one or more characteristics of the user for inclusion within the partial identity 106, 202, 252, 272. For example, the monitored network activities may indicate that the user device 134, 136, 138, 140, 142, 322, 324, 326 typically connects to and is active on the network provided by the access points 130, 132, 302, 304, 306, 308, 310 in the morning and evening hours. The user identifier 104 may then determine that the associated user is a business person (e.g., staying in a hotel for business-related purposes) and is otherwise located out side of the facility 300 during work hours.

In performing the above analyses, the user identifier 104 may utilize one or more machine learning models. In particular, the machine learning model may analyze the ordering and timing of these interactions for such patterns to determine one or more characteristics of the partial identity 106, 202, 252, 272 and/or the full identity 108, 212. In certain implementations, the machine learning model may perform analyses such as clustering observed activities, attribute-based analyses, characteristic-based analyses, behavioral analytics, pattern analysis, and location analysis. In particular, the machine learning model may include a random forest classifier configured to monitor frame size and frame timings (e.g., inter-arrival timings) of communications routed to the user device 134, 136, 138, 140, 142, 322, 324, 326 to detect timing-based indicators of internet usage. In another example, if a user device 134, 136, 138, 140, 142, 322, 324, 326 uses a virtual private network (VPN) for one set of communications, such as work or professional communications, and communicates outside of the VPN for another set of communications, such as personal communications, machine learning pattern analysis may determine the likelihood that the user is a business traveler who initially undertakes business operations and then personal operations. As a further example, the machine learning model of the user identifier 104 may use categories such as, e.g., travel, dining, technology, sports, fitness, news, social networks, politics, entertainment, and retail. In such instances, a lifestyle category may initially be used and then segmented into further categories, such as sports, leisure, health and the like. Such categories may be dynamically loaded and may vary by location. For example, the selection and origin of news sources may strongly indicate that the user is from a specific country or particular preferences.

Based on the above techniques, the user identifier 104 may gather the above information and network activities to create the partial identity 106, 202, 252, 272 without accessing personal information from the user. In addition, a change in usage pattern may indicate that a different user is using the user device 134, 136, 138, 140, 142, 322, 324, 326 (e.g., a child using a parent's user device 134, 136, 138, 140, 142, 322, 324, 326).

After completing the method 400, the user identifier 104 may determine a full identity 108, 212 of the user. In the example discussed above where the user provides a room number 210 to access the network provided by the access portals 130, 132, 302, 304, 306, 308, 310, the user identifier 104 may retrieve additional information regarding the user from a CRM system in certain implementations. For example, the user identifier 104 may retrieve enough information to generate a full identity 212 of the user (e.g., a full name 214, demographic information 216, contact information 218, and/or loyalty information 220). In still further implementations, the user identifier 104 may detect enough patterns and additional information for the partial identity 202 to determine that the partial identity 202 corresponds to a previously-identified full identity 212. The user identifier 104 may then continue processing with the full identity 212.

In certain implementations, once the user device 134, 136, 138, 140, 142, 322, 324, 326 leaves a service area of the network provided by the access points 130, 132, 302, 304, 306, 308, 310, or the associated facility 300 for a certain period of time (e.g., one day, one week, two weeks, one month), any identity associated with the user device 134, 136, 138, 140, 142, 322, 324, 326 may be deleted in order to protect user privacy.

Figure 5:
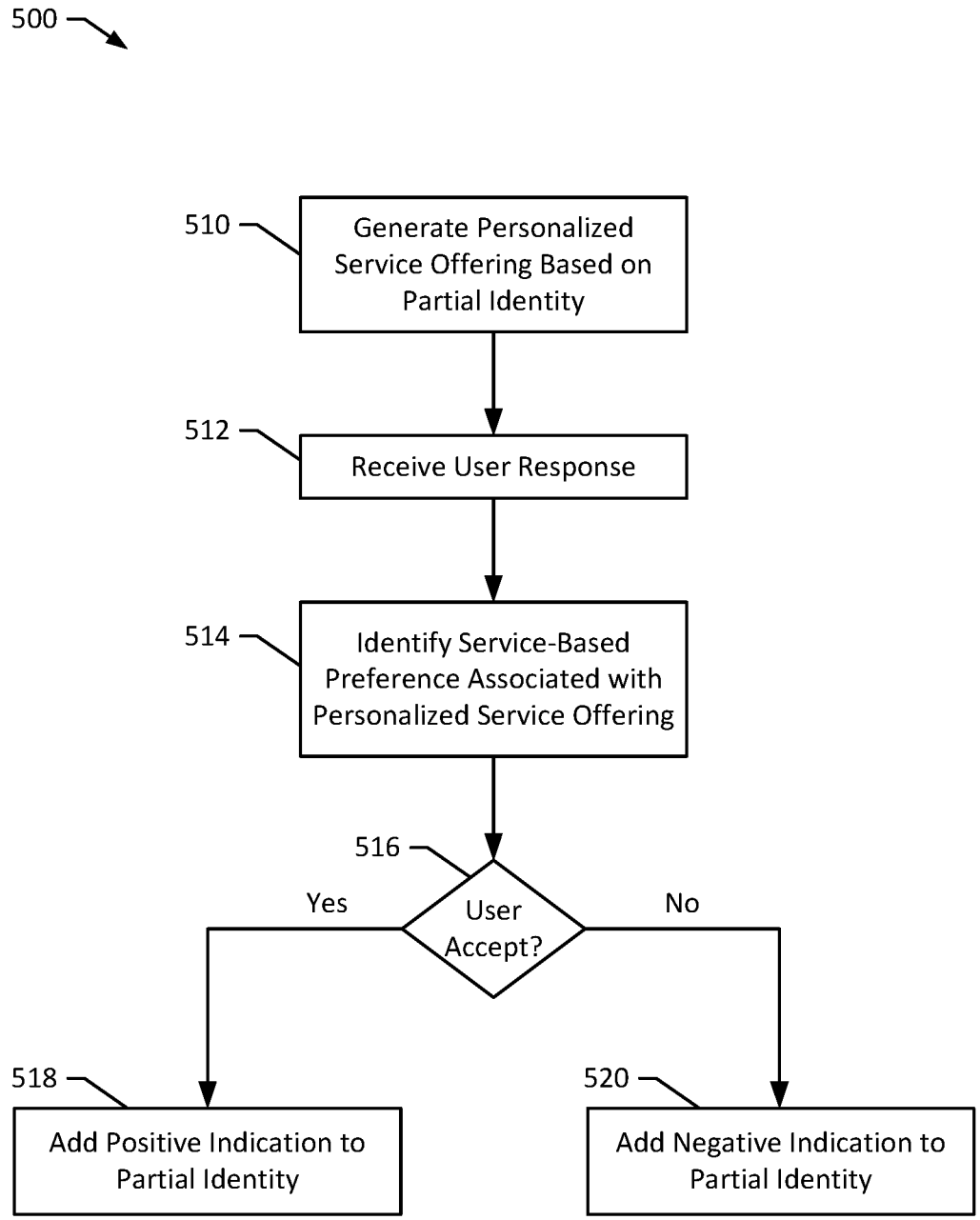
FIG. 5 illustrates a method according to an exemplary embodiment of the present disclosure.

FIG. 5 depicts an example method 500 according to an exemplary embodiment of the present disclosure. The method 500 may be performed to generate a personalized service offering 112 and to process responses received in response to the personalized service offering 112. The method 500 may be performed by a computer system such as the system 100, e.g., by the identification server 102 and/or the service offering generator 110. The method 500 may also be implemented by a set of instructions stored on a computer readable medium that, when executed by a processor, cause the computer system to perform the method. For example, all or part of the method 500 may be implemented by a processor and a memory responsible for implementing one or more features of the identification server 102. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with the service offering generator 110 generating a personalized service offering 112 based on the partial identity 106, 202, 252, 272 (block 510). For example, if the partial identity 106, 202, 252, 272 includes a preference 206, 256, 258, 276 indicating that the user frequents restaurants and/or bars, the service offering generator 110 may generate the personalized service offering 112 to include restaurant offers (e.g., coupons for discounts at restaurants affiliated with the company implementing the system 100). As another example, if the partial identity 106, 202, 252, 272 includes a preference 206, 256, 258, 276 that indicates that the user is a regular user of the gym facilities, additional water may be offered to them, even though their actual identity is unknown to the system (e.g., via the user devices 134, 136, 138, 140, 142, 322, 324, 326). If the partial identity 106, 202, 252, 272 includes a preference 206, 256, 258, 276 that indicates that user regularly uses an entertainment system on their user device 134, 136, 138, 140, 142, 322, 324, 326, the personalized service offering 112 may offer to link the user's preferred entertainment platform with, e.g., a hotel room entertainment system. As further detailed in connection with the offer generations 250, 298, the service offering generator 110 may review multiple available offers 266, 296 (e.g., from an offer repository) for offers with related preferences 262 that are the same or similar as the preferences 206, 256, 258, 276 stored within the partial identity 106, 202, 252, 272. The service offering generator may also compare available offer 266, 296 with previous offers rejected or accepted by the user and may further consider previous offers rejected or accepted by similar users. Available offers 266, 296 that resemble previously-accepted offers may be more likely for recommendation. After identifying such an available offer 266, the service offering generator 110 may generate the personalized service offering 112 to include the available offer 266.

In addition, in certain implementations, the user identifier 104 may be configured to determine appropriate pieces of information relevant to generating the personalized service offering 112.

The service offering generator 110 may then receive a user response from the user device 134, 136, 138, 140, 142, 322, 324, 326 (block 512). For example, after receiving the personalized service offering 112, the user may accept or deny the personalized service offering 112 via the user device 134, 136, 138, 140, 142, 322, 324, 326, which may accordingly generate and transmit a personalized service response 114 to the identification server 102 and the service offering generator (e.g., via the access points 130, 132, 302, 304, 306, 308, 310). In certain implementations, the personalized service response 114 may also or alternatively include a modified version of the personalized service offering 112.

The service offering generator 110 may then identify a service-based preference 113 associated with the personalized service offering 112 (block 514). For example, the service offering generator 110 may identify a service-based preference 113 regarding restaurants or dining out for a personalized service offering 112 that includes a discounted offer for a restaurant. As another example, the service offering generator 110 may identify a service-based preference 113 related to fitness for a personalized service offering 112 that includes an offering to schedule a workout (e.g., at a hotel fitness center). Although block 514 is depicted as occurring after blocks 510, 512, block 514 may be performed before or in parallel with the blocks 510, 512. For example, the service offering generator 110 may identify the service-based preference 113 in parallel with generating the personalized service offering at block 510 and before receiving the user response at block 512.

If the user accepts the personalized service offering 112 or a modified version of the personalized service offering 112 (block 516), the user identifier 104 may add a positive indication of the service-based preference 113 to the partial identity 106, 202, 252, 272. For example, if the user accepts a personalized service offering 112 that includes a discounted dining offer for a restaurant, the user identifier 104 may add a preference 206, 256, 258, 276 to the partial identity 106, 202, 252, 272 that indicates that the user enjoys dining out.

By contrast, if the user rejects the personalized service offering (block 516), the user identifier 104 may add a negative indication of the service-based preference 113 to the partial identity 106, 202, 252, 272. For example, if the user rejects a personalized service offering 112 that includes an offer to schedule a workout, the user identifier 104 may add a preference 206, 256, 258, 276 to the partial identity 106, 202, 252, 272 that indicates that the user does not enjoy exercise or fitness.

In either case, the updated partial identity 106, 202, 252, 272 may reflect a more complete collection of information regarding the user.

Figure 6:
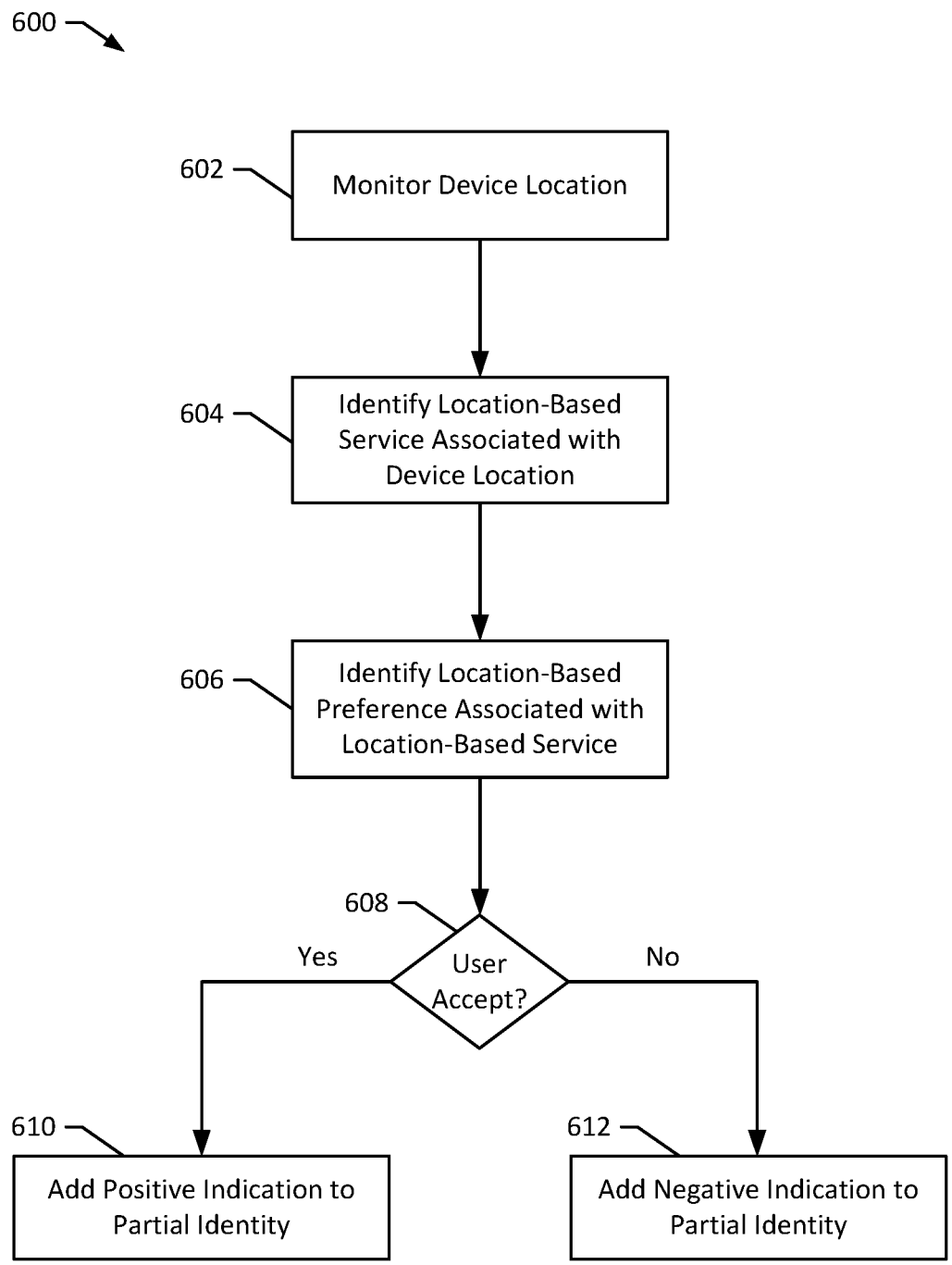
FIG. 6 illustrates a method according to an exemplary embodiment of the present disclosure.

FIG. 6 depicts a method 600 according to an exemplary embodiment of the present disclosure. The method 600 may be performed to update a partial identity 106, 202, 252, 272 and/or full identity 108, 212 associated with a user device 134, 136, 138, 140, 142, 322, 324, 326 based on location monitoring of the user device 134, 136, 138, 140, 142, 322, 324, 326. For example, method 600 may be performed by the system 100, such as by the identification server 102 and/or the location monitor 122. The method 600 may also be implemented by a set of instructions stored on a computer readable medium that, when executed by a processor, cause the computer system to perform the method. For example, all or part of the method 600 may be implemented by a processor and a memory responsible for implementing one or more features of the identification server 102. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with the location monitor 122 monitoring a device location 124 of the user device 134, 136, 138, 140, 142, 322, 324, 326 (block 602). As explained above in connection with FIG. 3, the location monitor 122 may determine the device location 124 based on the signal strength between the user device 134, 136, 138, 140, 142, 322, 324, 326 and one or more access points 130, 132, 302, 304, 306, 308, 310 within a facility 300. In particular, the location monitor 122 may rely on one or more geofenced locations corresponding to service areas 312, 314, 316, 31A, 320 of the access points 130, 132, 302, 304, 306, 308, 310. In certain implementations, the device location 124 of the user device 134, 136, 138, 140, 142, 322, 324, 326 may be monitored by trained relating the user device 134, 136, 138, 140, 142, 322, 324, 326 based on a signal strength between the user device 134, 136, 138, 140, 142, 322, 324, 326 and a plurality of access points 130, 132, 302, 304, 306, 308, 310. The device location 124 may also include zone information, such as a floor level within a facility 300 in which the user device 134, 136, 138, 140, 142, 322, 324, 326 is located. Still further implementations may rely on beacon technologies, such as Bluetooth Low Energy (BLE) and/or radiofrequency identification (RFID) tags and receivers.

The location monitor 122 may then identify a location-based service offering 126 associated with the device location 124 (block 604). For example, the location monitor 122 may determine that the user device 134, 136, 138, 140, 142, 322, 324, 326 is near a particular company or product and may identify a location-based service offering 126 for the particular company or product. In certain implementations, the facility 300 may include barcode and other interactional or locational beacons for location-based service offering 126 generation. In another implementation, the location monitor 122 may monitor the device location 124 over time to generate the location-based service offering 126. For example, if a user spends a lot of time in a location within a facility 300 (e.g., a mall) associated with food and beverage offerings, the location monitor 122 may generate a location-based service offering 126 for a discount at a restaurant in the food and beverage location within the facility 300. In generating the location-based service offering, the location monitor 122 may compare a location 278 from a partial identity 106, 202, 252, 272 against related locations 282 for one or more available offers 284, as described above in connection with the offer generation 270. As in that example, the location monitor 122 may identify available offers 284 for inclusion within the location-based service offering 126 as those available offers 284 with related locations 282 similar to location 278 of the partial identity. The location monitor 122 may also compare the available offers 284 to similar locations, such as when a user has visited a hotel property as compared to a central business district (CBD) property.

The location monitor 122 may then identify a location-based preference 125 associated with the location-based service offering 126 (block 604). In the previously-discussed examples, where the location-based service offering 126 includes a discount at a restaurant, the location monitor 122 may identify an associated location-based preference 125 related to dining. In certain implementations, where an available offer 284 is selected based on a related location 282, the location monitor 122 may identify a related preference 280 of the selected available offer 284 as a location-based preference 125.

Similar to the method 500, if the location-based service offering 126 is accepted (block 608), the location monitor 122 may add a positive indication of the location-based preference 125 to the partial identity 106, 202, 252, 272 (block 610). However, if the location-based service offering 126 is rejected (block 608), the location monitor 122 may add a negative indication of the location-based preference 125 to the partial identity 106, 202 (block 612).

In certain implementations, one or more of the blocks may be optional. For example, rather than generating a location-based service offering 126, block 604 may be omitted. In such implementations, the location-based preference 125 may be based on the device location 124 instead. For example, if the device location 124 indicates that a user device 134, 136, 138, 140, 142, 322, 324, 326 has spent extended periods of time in food and beverage or restaurant portions of the facility 300 (e.g., a shopping mall), the location monitor 122 may determine a location-based preference 125 for inclusion in the partial identity 106, 202, 252, 272 indicating a preference for dining out.

In still further implementations, the device location 124 may be used to verify that a particular user was at a given company or facility 300. For example, before allowing the user to post the online review, an online review platform may require location-based verification that the associated user was actually physically presence within the company or business being reviewed. Such an implementation may help reduce fake or retaliatory negative reviews.

FIG. 7A depicts a method 700 according to an exemplary embodiment of the present disclosure. The method 700 may be performed to cross-match a partial identity 106, 202, 252, 272 across multiple user devices 134, 136, 138, 140, 142 connected to a wireless network associated with the same user. For example, the method 700 may be performed by the identification server 102, such as by the user identifier 104. The method 700 may also be implemented by a set of instructions stored on a computer readable medium that, when executed by a processor, cause the computer system to perform the method. For example, all or part of the method 700 may be implemented by a processor and a memory responsible for implementing one or more features of the identification server 102. Although the examples below are described with reference to the flowchart illustrated in FIG. 7A, many other methods of performing the acts associated with FIG. 7A may be used. For example, the order of some of the blocks may be changed, certain blocks may be combined with other blocks, one or more of the blocks may be repeated, and some of the blocks described may be optional.

The method 700 begins with receiving a second request from a second user device that includes a second user device identifier (block 702). The second request, like the request received in block 402 of the method 400, may include a device identifier 204, 254, 274, 288 of the second user device, such as a MAC address of the second user device.

The user identifier 104 may then create a second partial identity 106, 202, 252, 272 for the second user device 134, 136, 138, 140, 142 (block 703). The second partial identity 106, 202, 252, 272, 286 may be created using any of the methods discussed above, such as the methods 400, 500, 600. The second partial identity 106, 202, 252, 272, 286 may be include the second user device identifier received with the second request.

The user identifier 104 may then identify a common portion between the second partial identity 106, 202, 252, 272 associated with the second user device 134, 136, 138, 140, 142 and the first partial identity 106, 202, 252, 272 associated with the first user device 134, 136, 138, 140, 142 (block 704). The common portion may include one or more one or more overlapping portions of the partial identities 106, 202, 252, 272, such as the same room number 260 and/or a plurality of identical or similar preferences 206, 256, 258, 276, 290, 292. In certain implementations, the user identifier 104 may also include a machine learning model trained to predict a percentage likelihood that the partial identity 106, 202, 252, 272 associated with the second user device 134, 136, 138, 140, 142 corresponds to the same user as the partial identity 106, 202, 252, 272 associated with the first user device 134, 136, 138, 140, 142. If the predicted likelihood exceeds a predetermined threshold, the user identifier 104 may determine that the two partial identities 106, 202, 252, 272 share a common portion and accordingly relate to the same user.

The user identifier 104 may then associate the second user device with the first partial identity 106, 202, 252, 272 (block 706). For example, the user identifier 104 may add the second device identifier 204, 254, 274, 288 to the first partial identity 106, 202, 252, 272. In certain implementations, the user identifier 104 may also add one or more preferences 206, 256, 258, 276, 290, 292 from the second partial identity 106, 202, 252, 272 to the first identity 106, 202, 252, 272. In particular, the user device 104 may add preferences determined while creating the second partial identity 106, 202, 252, 272 that were not a part of the common portion identified at block 704. Such preferences may help improve the quality and accuracy of the first partial identity 106, 202, 252, 272.

FIG. 7B depicts a method 710 according to an exemplary embodiment of the present disclosure. The method 710 may be performed to cross-match a partial identity 106, 202, 252, 272 across visits to multiple locations by the same user device 134, 136, 138, 140, 142. For example, the method 710 may be performed by the identification server 102, such as by the user identifier 104. The method 710 may also be implemented by a set of instructions stored on a computer readable medium that, when executed by a processor, cause the computer system to perform the method. For example, all or part of the method 710 may be implemented by a processor and a memory responsible for implementing one or more features of the identification server 102. Although the examples below are described with reference to the flowchart illustrated in FIG. 7B, many other methods of performing the acts associated with FIG. 7B may be used. For example, the order of some of the blocks may be changed, certain blocks may be combined with other blocks, one or more of the blocks may be repeated, and some of the blocks described may be optional.

The method 710 begins with receiving a second request from a second user device 134, 136, 138, 140, 142 to connect to a second local network (block 712). For example, additional access points 130, 132 may implement a second wireless network at a second location, such as a second hotel owned by the same hotel group. As with the first request received at block 402 in the method 400, the second request may include a user identifier, such as a device identifier 204, 254, 274, 288 of the user device. Additionally, the access points 130, 132 may present a captive portal to gather additional information and/or to authenticate the user.

Based on the received request, the identification server 102 may update the partial identity 106, 202, 252, 272 (block 714). For example, the identification server 102 may store a plurality of partial identities 106, 202, 252, 272 and associated device identifiers 204, 254, 274, 288. The identification server 102 may then compare the device identifier 204, 254, 274, 288 received with the second request to the associated device identifiers 204, 254, 274, 288 to identify a partial identity 106, 202, 252, 272 associated with the same device identifier 204, 254, 274, 288. The identification server 102 may then update the partial identity 106, 202, 252, 272, e.g., with an indication that the associated user has also been to the second location. For example, if the partial identity 106, 202, 252, 272 was initial created while a user was at a first hotel in a first city and the second request is received at a second hotel in a second city, the user identifier 104 may update the 106, 202, 252, 272 with a preference 206, 256, 258, 276, 290, 292 that the user travels regularly, or that the user travels between the first and second cities.

In certain implementations where the identification server 102 is implemented locally for both networks, the identification server 102 may connect to a central partial identity repository shared between identification servers 102 across locations (e.g., related business locations). In still further implementations, the identification server 102 itself may be centrally implemented and may receive information from both networks in both locations to centrally create and manage partial and full identities 106, 108, 202, 212, 252, 272.

Additional exemplary implementations of the above-discussed systems and methods are discussed below. These examples should not be interpreted to limit any of the above-discussed details and exemplary implementations, but rather to provide additional, alternative details regarding other implementations. In one such embodiment, a hotel may provide a wireless network for users. Upon connecting to the network, a user device may be presented with a captive portal customized by the hotel provider. The user may have the choice of signing in using a single click via social networks (e.g., Facebook®, Twitter®, Instagram®) or using their email address. Access points implementing the network may also capture unique device identifiers when the user device connects. Based on the device identifier and the information received via the captive portal, the hotel may create partial identities that can help acquire new customers, target sales offers, build loyalty with personalized communications, create campaigns based on contextual data, understand customers better through new insights, and refine audience segmentation. In particular, by associating service requests to individual users via the partial identities, the system may help provide anticipatory service offerings to the user, preempting negative interactions that may result in negative online reviews.

In another example, a hotel may provide a wireless network that presents a prompt to user devices upon connecting to the network asking, "How are you enjoying your stay so far?" The prompt may also present a scale (e.g., a scale from 1-5). In certain implementations, the scale may also include one or more pictograph representations of emotions (e.g., emojis) to expedite the user's feedback process. If the user provides a low rating (e.g., a rating of 3 or less), the system may present a query asking what issues the user is having with the hotel. In certain implementations, the user may also be queried to provide a room number. The user's response to this query may then be routed to hotel staff for immediate rectification of the user's problems. Such quick responses may help the hotel get ahead of guests' problems and dramatically reduce service response times so the hotel can solve the issues before users' stays end and may preempt negative reviews.

In a third example, an event venue may provide wireless networking services to guests visiting the venue. Upon connecting to the network, the user device may be presented with a captive portal providing one-click sign-in using social media accounts and/or an email address. Based on the provided information, the system may determine demographic information regarding users and may incorporate the determined demographic information into a partial identity associated with the user devices. The partial identities may then be used to ascertain further demographic information regarding the venue's overall visitor pool, which may assist with marketing, sales, and other business efforts.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
    receiving a request from a user device to connect to a local network, wherein the request includes a user device identifier but does not include a full identity of the user of the user device, the full identity of the user including at least one of the user's name, government issued identification number, mailing address, login name, or email address;
    allowing the user device to connect to the local network without determining the full identity of the user;
    responsive to allowing the user device to connect, creating a partial identity of a user of the user device, wherein the partial identity includes a plurality of identification factors associated with the user, but does not include the user's name, government issued identification number, mailing address, login name, or email address;
    monitoring one or more network activities of the user device on the local network; and
    updating the partial identity of the user based on the one or more monitored network activities.

2. The method of claim 1, further comprising:
presenting a user feedback request to the user device without determining the full identity of the user;
receiving a response to the user feedback request; and
storing the response associated with the partial identity.

3. The method of claim 1, further comprising:
generating a personalized service offering for the user based on the partial identity without determining the full identity of the user.

4. The method of claim 3, further comprising:
updating the partial identity responsive to the user accepting or rejecting the personalized service offering by:
identifying a service-based preference associated with the personalized service offering;
responsive to the user accepting the personalized service offering, adding a positive indication of the service-based preference to the partial identity; and
responsive to the user rejecting the personalized service offering, adding a negative indication of the service-based preference to the partial identity.

5. The method of claim 1, further comprising:
monitoring locations of the user device within a network service area of the local network, wherein the locations are determined based at least in part on a signal strength between the user device and a wireless network device implementing the local network, and
updating the partial identity based on the monitored locations.

6. The method of claim 5, wherein updating the partial identity based on the monitored locations further comprises:
identifying a location-based service associated with a physical location of the user device within the network service area indicated by the signal strength between the user device and a network device implementing the local network;
identifying a location-based preference associated with the location-based service; and
adding an indication of the location-based preference to the partial identity.

7. The method of claim 1, wherein the network activities include one or more activities selected from the group consisting of: the user device accessing one or more network services, network usage patterns of the user device, and web browsing activities of the user device.

8. The method of claim 1, wherein allowing the user device to connect to the local network includes receiving user credentials associated with a user of the user device, and wherein creating the partial identity further includes deriving a user identifier from the user credentials.

9. The method of claim 1, further comprising:
continuing to monitor one or more additional network activities of the user device on the local network; and
obtaining the full identity of the user based on the one or more additional network activities.

10. The method of claim 9, wherein the full identity further includes at least one of a full name of the user, a preference of the user, an email address of the user, and a phone number of the user.

11. The method of claim 1, further comprising:
receiving a second request from a second user device to connect to the local network, wherein the request includes a second user device identifier;
identifying a common portion of the partial identity and the second user device identifier; and
associating the second user device with the partial identity.

12. The method of claim 1, further comprising:
receiving a second request from the user device to connect to a second local network, wherein the request includes the user device identifier; and
updating the partial identity to include the second local network.

13. A system comprising:
a processor; and
a memory storing instructions which, when executed by the processor, cause the processor to:
receive a request from a user device to connect to a local network, wherein the request includes a user device identifier but does not include a full identity of the user of the user device, the full identity of the user including at least one of the user's name, government issued identification number, mailing address, login name, or email addres;
allow the user device to connect to the local network without determining the full identity of the user;
responsive to allowing the user device to connect, create a partial identity of a user of the user device, wherein the partial identity includes a plurality of identification factors associated with the user but does not include the user's name, government issued identification number, mailing address, login name, or email address;
monitor one or more network activities of the user device on the local network; and
update the partial identity of the user based on the one or more monitored network activities.

14. The system of claim 13, wherein the memory stores further instructions which, when executed by the processor, cause the processor to:
present a user feedback request to the user device without determining a full identity of the user;
receive a response to the user feedback request; and
store the response associated with the partial identity.

15. The system of claim 13, wherein the memory stores further instructions which, when executed by the processor, cause the processor to:
generate a personalized service offering for the user based on the partial identity without determining the full identity of the user; and
update the partial identity responsive to the user accepting or rejecting the personalized service offering by:
identifying a service-based preference associated with the personalized service offering;
responsive to the user accepting the personalized service offering, adding a positive indication of the service-based preference to the partial identity; and
responsive to the user rejecting the personalized service offering, adding a negative indication of the service-based preference to the partial identity.

16. The system of claim 13, wherein the memory stores further instructions which, when executed by the processor, cause the processor to:
monitor locations of the user device within a network service area of the local network over time, wherein the locations are determined based at least in part on a signal strength between the user device and a wireless network device implementing the local network, and
wherein the partial identity is also updated based on the monitored locations.

17. The system of claim 16, wherein the memory stores further instructions which, when executed by the processor while updating the partial identity based on the monitored locations, cause the processor to:

identify a location-based service associated with a physical location of the user device within the network service area indicated by the signal strength between the user device and a network device implementing the local network;

identify a location-based preference associated with the location-based service; and add an indication of the location-based preference to the partial identity.

18. The system of claim 13, wherein the memory stores further instructions which, when executed by the processor, cause the processor to:

receive a second request from a second user device to connect to the local network, wherein the request includes a second user device identifier;

identify a common portion of the partial identity and the second user device identifier; and associate the second user device with the partial identity.

19. The system of claim 13, wherein the memory stores further instructions which, when executed by the processor, cause the processor to:

receive a second request from the user device to connect to a second local network, wherein the request includes the user device identifier; and update the partial identity to include the second local network.

20. A non-transitory, computer-readable medium storing instructions which, when executed by a processor, cause the processor to:

receive a request from a user device to connect to a local network, wherein the request includes a user device identifier but does not include a full identity of the user of the user device, the full identity of the user including at least one of the user's name, government issued identification number, mailing address, login name, or email address;

allow the user device to connect to the local network without determining the full identity of the user;

responsive to allowing the user device to connect, create a partial identity of a user of the user device, wherein the partial identity is a collection of identification factors associated with the user but does not include the user's name, government issued identification number, mailing address, login name, or email address;

monitor one or more network activities of the user device on the local network; and update the partial identity of the user based on the one or more monitored network activities.

* * * * *